US008112312B2

(12) United States Patent
Ritter

(10) Patent No.: US 8,112,312 B2
(45) Date of Patent: Feb. 7, 2012

(54) MULTIVARIATE TESTING OPTIMIZATION METHOD

(76) Inventor: Johannes Ritter, Frankfurt am Main (DE)

( * ) Notice: Subject to any disclaimer, the term of this patent is extended or adjusted under 35 U.S.C. 154(b) by 736 days.

(21) Appl. No.: 11/875,242

(22) Filed: Oct. 19, 2007

(65) Prior Publication Data

US 2008/0097829 A1 Apr. 24, 2008

Related U.S. Application Data

(60) Provisional application No. 60/853,792, filed on Oct. 19, 2006.

(51) Int. Cl.
*G06Q 40/00* (2006.01)
(52) U.S. Cl. .................. 705/14.72; 705/14.73
(58) Field of Classification Search .............. 705/14, 705/14.72, 14.73
See application file for complete search history.

(56) References Cited

U.S. PATENT DOCUMENTS

| | | | |
|---|---|---|---|
| 2005/0216339 A1* | 9/2005 | Brazell et al. | 705/14 |
| 2006/0095340 A1* | 5/2006 | Iadanza et al. | 705/26 |
| 2006/0149631 A1* | 7/2006 | Brazell et al. | 705/14 |
| 2007/0027756 A1* | 2/2007 | Collins et al. | 705/14 |
| 2007/0027760 A1* | 2/2007 | Collins et al. | 705/14 |
| 2007/0027761 A1* | 2/2007 | Collins et al. | 705/14 |
| 2007/0204002 A1* | 8/2007 | Calderone | 709/217 |
| 2007/0219866 A1* | 9/2007 | Wolf et al. | 705/14 |
| 2007/0299933 A1* | 12/2007 | Moon | 709/218 |
| 2008/0040224 A1* | 2/2008 | Roker | 705/14 |
| 2008/0270223 A1* | 10/2008 | Collins et al. | 705/10 |

OTHER PUBLICATIONS

"Genichi Taguchi," *Wikipedia: The Free Encyclopedia*, http://en.wikipedia.org/wiki/Genichi_Taguchi, Accessed Mar. 24, 2008.

\* cited by examiner

*Primary Examiner* — Jagdish Patel
*Assistant Examiner* — Kevin Poe
(74) *Attorney, Agent, or Firm* — Alleman Hall McCoy Russell & Tuttle LLP

(57) ABSTRACT

An advertisement optimization approach is presented, which utilizes multivariate testing to correlate characteristics of an advertisement to favorable responses received from an environment to which the advertisement was provided. As one example, a text based webpage advertisement may be tested to optimize a variety of different characteristics of the advertisement for response metrics such as click-through rate and conversion rate. Additional approaches are described, whereby advertisements may be tested and optimized across a plurality of different media formats, including both electronic and non-electronic media.

19 Claims, 29 Drawing Sheets

| Array Name | Factors | Levels |
|---|---|---|
| $L_4 (2^3)$ | 3 | 2 |
| $L_8 (2^7)$ | 7 | 2 |
| $L_{12} (2^{11})$ | 11 | 2 |
| $L_{16} (2^{15})$ | 15 | 2 |
| $L_{32} (2^{31})$ | 31 | 2 |
| $L_9 (3^4)$ | 4 | 3 |
| $L_{27} (3^{13})$ | 13 | 3 |
| $L_{16} (4^5)$ | 5 | 4 |
| $L_{64} (4^{21})$ | 21 | 4 |
| * $L_{18} (2^1, 3^7)$ | 1 | 2 |
| | and 7 | 3 |
| * $L_{32} (2^1, 4^9)$ | 1 | 2 |
| | and 9 | 4 |

FIG. 8

| | | |
|---|---|---|
| Headline: | automatic backup software | Max 25 characters |
| Description line 1: | let our software worry about | Max 35 characters |
| Description line 2: | archiving your office documents | Max 35 characters |
| Display URL: [?] | http:// carsonspage.com | Max 35 characters |
| Destination URL: [?] | http:// ▼ carsonspage.com | Max 1024 characters |

FIG. 9

|  | Factor | A | B | C | D | E | F | G |
|---|---|---|---|---|---|---|---|---|
| AD Number |  |  |  |  |  |  |  |  |
| 1 |  | 1 | 1 | 1 | 1 | 1 | 1 | 1 |
| 2 |  | 1 | 1 | 1 | 2 | 2 | 2 | 2 |
| 3 |  | 1 | 2 | 2 | 1 | 1 | 2 | 2 |
| 4 |  | 1 | 2 | 2 | 2 | 2 | 1 | 1 |
| 5 |  | 2 | 1 | 2 | 1 | 2 | 1 | 2 |
| 6 |  | 2 | 1 | 2 | 2 | 1 | 2 | 1 |
| 7 |  | 2 | 2 | 1 | 1 | 2 | 2 | 1 |
| 8 |  | 2 | 2 | 1 | 2 | 1 | 1 | 2 |

FIG. 11

| Factor | Level 1 | Level 2 |
|---|---|---|
| Headline | backup software | dynamic |
| Description Line 1 | all formats supported for jus price | jus price protecting your data ! |
| Description Line 2 | bonus offer, reliable, professional | bonus offer, ease backup process |
| Display URL | www.carsonspage.com | www.archivingexperts.com |
| Price | $20 | $40 |
| Bonus Offer | none | free trial |
| Capitalization | lower case letters | mixed letters |

FIG. 12

|  | Factor | Headline | Capitalization |
|---|---|---|---|
| AD Number |  |  |  |
| 1 |  | backup software | lower case |
| 2 |  | Backup Software | mixed |
| 3 |  | Backup Software | mixed |
| 4 |  | backup software | lower case |

FIG. 13

|  | Description Line 1 | Price | Capitalization |
|---|---|---|---|
| AD Number |  |  |  |
| 1 | all formats supported for just $20 | $20 | lower case |

FIG. 14

| AD Number | Factor | Headline | Description Line 1 | Description Line 2 | Display URL | Price | Bonus Offer | Capitalization |
|---|---|---|---|---|---|---|---|---|
| 1 | | backup software | all formats supported for just $20 | reliable, professional | www.carsonspage.com | $20 | none | lower case |
| 2 | | Backup Software | all Formats supported for Just $40 | Free Trial, Reliable, Professional | www.ArchivingExperts.com | $40 | free trial, | mixed |
| 3 | | Backup Software | Just $20 protecting Your Data ! | Free Trial, ease Backup Process | www.CarsonsPage.com | $20 | free trial, | mixed |
| 4 | | backup software | just $40 protecting your data ! | ease backup process | www.archivingexperts.com | $40 | none | lower case |
| 5 | | dynamic: Backup Software | all Formats supported for Just $40 | ease Backup Process | www.CaronsPage.com | $40 | none | mixed |
| 6 | | dynamic: backup software | all formats supported for just $20 | ease backup process | www.archivingexperts.com | $20 | free trial, | lower case |
| 7 | | dynamic: backup software | just $40 protecting your data ! | free trial, reliable, professional | www.carsonspage.com | $40 | free trial, | lower case |
| 8 | | dynamic: Backup Software | Just $20 protecting Your Data ! | Reliable, Professional | www.ArchivingExperts.com | $20 | none | mixed |

FIG. 15

FIG. 16A backup software
all formats supported for just $20
reliable, professional
www.carsonspage.com

FIG. 16B

Backup Software
all Formats supported for Just $40
Free Trial, Reliable, Professional
www.ArchivingExperts.com

FIG. 16C

Backup Software
Just $20 protecting Your Data !
Free Trial, ease Backup Process
www.CarsonsPage.com

FIG. 16D backup software
just $40 protecting your data !
ease backup process
www.archivingexperts.com

FIG. 16E

{KeyWord: Backup Software}
all Formats supported for Just $40
ease Backup Process
www.CarsonsPage.com

FIG. 16F

{KeyWord: backup software}
all formats supported for just $20
free trial, ease backup process
www.archivingexperts.com

FIG. 16G

{KeyWord: backup software}
just $40 protecting your data !
free trial, reliable, professional
www.carsonspage.com

FIG. 16H

{KeyWord: Backup Software}
Just $20 protecting Your Data !
Reliable, Professional
www.ArchivingExperts.com

| | Impressions | Clicks | Served % | CTR % | Conversions | CR % | Time |
|---|---|---|---|---|---|---|---|
| Data 1<br>backup software<br>all formats supported for just $20<br>reliable, professional<br>www.carsonspage.com | | | | | | | |
| Data 2<br>Backup Software<br>all Formats supported for Just $40<br>Free Trial, Reliable, Professional<br>www.ArchivingExperts.com | | | | | | | |
| Data 3<br>Backup Software<br>Just $20 protecting Your Data !<br>Free Trial, ease Backup Process<br>www.CarsonsPage.com | | | | | | | |
| Data 4<br>backup software<br>just $40 protecting your data !<br>ease backup process<br>www.archivingexperts.com | | | | | | | |

FIG. 19A

| | Impressions | Clicks | Served % | CTR | Conversions | CR % | Time |
|---|---|---|---|---|---|---|---|
| Data 5 {KeyWord: Backup Software} all Formats supported for Just $40 ease Backup Process www.CarsonsPage.com | | | | | | | |
| Data 6 {KeyWord: backup software} all formats supported for just $20 free trial, ease backup process www.archivingexperts.com | | | | | | | |
| Data 7 {KeyWord: backup software} just $40 protecting your data ! free trial, reliable, professional www.carsonspage.com | | | | | | | |
| Data 8 {KeyWord: Backup Software} Just $20 protecting Your Data ! Reliable, Professional www.ArchivingExperts.com | | | | | | | |

FIG. 19B

| | Impressions = 349770 | Clicks= 14660 | Served % | CTR | Conversions | CR % | Time |
|---|---|---|---|---|---|---|---|
| Data 1 <br> backup software <br> all formats supported for just $20 <br> reliable, professional <br> www.carsonspage.com | 41623 | 1440 | 11.9 | 0.0346 | 17 | 0.0118 | April 11 - April 17 |
| Data 2 <br> Backup Software <br> all Formats supported for Just $40 <br> Free Trial, Reliable, Professional <br> www.ArchivingExperts.com | 44421 | 1320 | 12.7 | 0.02972 | 44 | 0.0333 | April 11 - April 17 |
| Data 3 <br> Backup Software <br> Just $20 protecting Your Data ! <br> Free Trial, ease Backup Process <br> www.CarsonsPage.com | 43721 | 2700 | 12.5 | 0.06175 | 12 | 0.0044 | April 11 - April 17 |
| Data 4 <br> backup software <br> just $40 protecting your data ! <br> ease backup process <br> www.archivingexperts.com | 40923 | 1880 | 11.7 | 0.04594 | 47 | 0.025 | April 11 - April 17 |

FIG. 20A

| | Impressions | Clicks | Served % | CTR | Conversions | CR % | Time |
|---|---|---|---|---|---|---|---|
| Data 5 {KeyWord: Backup Software} all Formats supported for Just $40 ease Backup Process www.CarsonsPage.com | 45470 | 1820 | 13 | 0.04003 | 52 | 0.0286 | April 11 - April 17 |
| Data 6 {KeyWord: backup software} all formats supported for just $20 free trial, ease backup process www.archivingexperts.com | 44771 | 1770 | 12.8 | 0.03953 | 54 | 0.0305 | April 11 - April 17 |
| Data 7 {KeyWord: backup software} just $40 protecting your data ! free trial, reliable, professional www.carsonspage.com | 44421 | 660 | 12.7 | 0.01486 | 44 | 0.0667 | April 11 - April 17 |
| Data 8 {KeyWord: Backup Software} Just $20 protecting Your Data ! Reliable, Professional www.ArchivingExperts.com | 44421 | 3070 | 12.7 | 0.06911 | 100 | 0.0326 | April 11 - April 17 |

FIG. 20B

| | Impressions = 332782 | Clicks= 14902 | Served % | CTR | Conversions | CR % | Time |
|---|---|---|---|---|---|---|---|
| Data 1<br>backup software<br>all formats supported for just $20<br>reliable, professional<br>www.carsonspage.com | 38935 | 1822 | 11.7 | 0.0468 | 11 | 0.006 | April 18 - April 24 |
| Data 2<br>Backup Software<br>all Formats supported for Just $40<br>Free Trial, Reliable, Professional<br>www.ArchivingExperts.com | 43262 | 1328 | 13 | 0.0307 | 88 | 0.0663 | April 18 - April 24 |
| Data 3<br>Backup Software<br>Just $20 protecting Your Data !<br>Free Trial, ease Backup Process<br>www.CarsonsPage.com | 40599 | 2476 | 12.2 | 0.06099 | 7 | 0.0028 | April 18 - April 24 |
| Data 4<br>backup software<br>just $40 protecting your data !<br>ease backup process<br>www.archivingexperts.com | 38935 | 1739 | 11.7 | 0.04466 | 77 | 0.0443 | April 18 - April 24 |

FIG. 21A

| | Impressions | Clicks | Served % | CTR | Conversions | CR % | Time |
|---|---|---|---|---|---|---|---|
| Data 5 {KeyWord: Backup Software} all Formats supported for Just $40 ease Backup Process www.CarsonsPage.com | 42263 | 1688 | 12.7 | 0.03994 | 46 | 0.0273 | April 18 - April 24 |
| Data 6 {KeyWord: backup software} all formats supported for just $20 free trial, ease backup process www.archivingexperts.com | 44593 | 1645 | 13.4 | 0.03689 | 59 | 0.0359 | April 18 - April 24 |
| Data 7 {KeyWord: backup software} just $40 protecting your data ! free trial, reliable, professional www.carsonspage.com | 41931 | 701 | 12.6 | 0.01672 | 38 | 0.0542 | April 18 - April 24 |
| Data 8 {KeyWord: Backup Software} Just $20 protecting Your Data ! Reliable, Professional www.ArchivingExperts.com | 42263 | 3503 | 12.7 | 0.08289 | 66 | 0.0188 | April 18 - April 24 |

FIG. 21B

|  | Impressions = 352739 | Clicks= 15186 | Served % | CTR | Conversions | CR % | Time |
|---|---|---|---|---|---|---|---|
| Data 1: backup software / all formats supported for just $20 / reliable, professional / www.carsonspage.com | 41270 | 1932 | 11.7 | 0.04681 | 27 | 0.014 | April 25 - May 1 |
| Data 2: Backup Software / all Formats supported for Just $40 / Free Trial, Reliable, Professional / www.ArchivingExperts.com | 45503 | 1277 | 12.9 | 0.02806 | 53 | 0.0415 | April 25 - May 1 |
| Data 3: Backup Software / Just $20 protecting Your Data! / Free Trial, ease Backup Process / www.CarsonsPage.com | 43034 | 2649 | 12.2 | 0.06156 | 22 | 0.0083 | April 25 - May 1 |
| Data 4: backup software / just $40 protecting your data! / ease backup process / www.archivingexperts.com | 41976 | 1732 | 11.9 | 0.04126 | 54 | 0.0312 | April 25 - May 1 |

FIG. 22A

| | Impressions | Clicks | Served % | CTR | Conversions | CR % | Time |
|---|---|---|---|---|---|---|---|
| Data 5 {KeyWord: Backup Software} all Formats supported for Just $40 ease Backup Process www.CarsonsPage.com | 44445 | 1755 | 12.6 | 0.03949 | 62 | 0.0353 | April 25 - May 1 |
| Data 6 {KeyWord: backup software} all formats supported for just $20 free trial, ease backup process www.archivingexperts.com | 46914 | 1638 | 13.3 | 0.03491 | 77 | 0.047 | April 25 - May 1 |
| Data 7 {KeyWord: backup software} just $40 protecting your data ! free trial, reliable, professional www.carsonspage.com | 44798 | 598 | 12.7 | 0.01335 | 48 | 0.0803 | April 25 - May 1 |
| Data 8 {KeyWord: Backup Software} Just $20 protecting Your Data ! Reliable, Professional www.ArchivingExperts.com | 44798 | 3605 | 12.7 | 0.08047 | 107 | 0.0297 | April 25 - May 1 |

FIG. 22B

|  | Impressions = 362433 | Clicks= 14006 | Served % | CTR | Conversions | CR % | Time |
|---|---|---|---|---|---|---|---|
| Data 1 | backup software<br>all formats supported for just $20<br>reliable, professional<br>www.carsonspage.com | 45667 | 1644 | 12.6 | 0.036 | 22 | 0.0134 | May 2 - May 8 |
| Data 2 | Backup Software<br>all Formats supported for Just $40<br>Free Trial, Reliable, Professional<br>www.ArchivingExperts.com | 43854 | 1173 | 12.1 | 0.02675 | 18 | 0.0153 | May 2 - May 8 |
| Data 3 | Backup Software<br>Just $20 protecting Your Data !<br>Free Trial, ease Backup Process<br>www.CarsonsPage.com | 47841 | 2385 | 13.2 | 0.04985 | 16 | 0.0067 | May 2 - May 8 |
| Data 4 | backup software<br>just $40 protecting your data !<br>ease backup process<br>www.archivingexperts.com | 43130 | 1638 | 11.9 | 0.03798 | 48 | 0.0293 | May 2 - May 8 |

FIG. 23A

| | Impressions | Clicks | Served % | CTR | Conversions | CR % | Time |
|---|---|---|---|---|---|---|---|
| Data 5 {KeyWord: Backup Software} all Formats supported for Just $40 ease Backup Process www.CarsonsPage.com | 45667 | 1589 | 12.6 | 0.0348 | 44 | 0.0277 | May 2 - May 8 |
| Data 6 {KeyWord: backup software} all formats supported for just $20 free trial, ease backup process www.archivingexperts.com | 48204 | 1485 | 13.3 | 0.03081 | 52 | 0.035 | May 2 - May 8 |
| Data 7 {KeyWord: backup software} just $40 protecting your data ! free trial, reliable, professional www.carsonspage.com | 42042 | 599 | 11.6 | 0.01425 | 54 | 0.0902 | May 2 - May 8 |
| Data 8 {KeyWord: Backup Software} Just $20 protecting Your Data ! Reliable, Professional www.ArchivingExperts.com | 46029 | 3493 | 12.7 | 0.07589 | 132 | 0.0378 | May 2 - May 8 |

FIG. 23B

| AD Number | Week 1 Conversions | Week 1 Clicks | Week 2 Conversions | Week 2 Clicks | Week 3 Conversions | Week 3 Clicks | Week 4 Conversions | Week 4 Clicks | SUM Conversions | SUM Clicks | Average Conversions |
|---|---|---|---|---|---|---|---|---|---|---|---|
| 1 | 17 | 1440 | 11 | 1822 | 27 | 1932 | 22 | 1644 | 77 | 6838 | 0.011260603 |
| 2 | 44 | 1320 | 88 | 1328 | 53 | 1277 | 18 | 1173 | 203 | 5098 | 0.039819537 |
| 3 | 12 | 2700 | 7 | 2476 | 22 | 2649 | 16 | 2385 | 57 | 10210 | 0.005582762 |
| 4 | 47 | 1880 | 77 | 1739 | 54 | 1732 | 48 | 1638 | 226 | 6989 | 0.032336529 |
| 5 | 52 | 1820 | 46 | 1688 | 62 | 1755 | 44 | 1589 | 204 | 6852 | 0.029772329 |
| 6 | 54 | 1770 | 59 | 1645 | 77 | 1638 | 52 | 1485 | 242 | 6538 | 0.037014377 |
| 7 | 44 | 660 | 38 | 701 | 48 | 598 | 54 | 599 | 184 | 2558 | 0.071931196 |
| 8 | 100 | 3070 | 66 | 3503 | 107 | 3605 | 132 | 3493 | 405 | 13671 | 0.029624753 |
| SUM | 370 | 14660 | 392 | 14902 | 450 | 15186 | 386 | 14006 | 1598 | 58754 | 0.027198148 |
| | | | | | | | | | | S/N Average = | -15.53485053 |

FIG. 25

| Ad | Headline | | Description Line 1 | | Description Line 2 | | Display URL | | Price | | Bonus Offer | | Capitalization | |
|---|---|---|---|---|---|---|---|---|---|---|---|---|---|---|
| | L1 | L2 | L1 | L2 | L1 | L2 | L1 | L2 | L1 | L2 | L1 | L2 | L1 | L2 |
| 1 | 77 | 0 | 77 | 0 | 77 | 0 | 77 | 0 | 77 | 0 | 77 | 0 | 77 | 0 |
| 2 | 203 | 0 | 203 | 0 | 0 | 0 | 0 | 203 | 0 | 203 | 0 | 203 | 0 | 203 |
| 3 | 57 | 0 | 0 | 57 | 0 | 57 | 57 | 0 | 57 | 0 | 0 | 57 | 0 | 57 |
| 4 | 226 | 0 | 0 | 226 | 0 | 226 | 0 | 226 | 0 | 226 | 226 | 0 | 226 | 0 |
| 5 | 0 | 204 | 204 | 0 | 0 | 204 | 204 | 0 | 0 | 204 | 204 | 0 | 0 | 204 |
| 6 | 0 | 242 | 242 | 0 | 242 | 0 | 0 | 242 | 242 | 0 | 0 | 242 | 242 | 0 |
| 7 | 0 | 184 | 0 | 184 | 0 | 0 | 184 | 0 | 0 | 184 | 0 | 184 | 184 | 0 |
| 8 | 0 | 405 | 0 | 405 | 405 | 0 | 0 | 405 | 405 | 0 | 405 | 0 | 0 | 405 |
| SUM | 563 | 1035 | 726 | 872 | 869 | 729 | 522 | 1076 | 781 | 817 | 912 | 686 | 729 | 869 |

FIG. 26

| Ad | Headline | | Description Line 1 | | Description Line 2 | | Display URL | | Price | | Bonus Offer | | Capitalization | |
|---|---|---|---|---|---|---|---|---|---|---|---|---|---|---|
| | L1 | L2 | L1 | L2 | L1 | L2 | L1 | L2 | L1 | L2 | L1 | L2 | L1 | L2 |
| 1 | 6838 | 0 | 6838 | 0 | 6838 | 0 | 6838 | 0 | 6838 | 0 | 6838 | 0 | 6838 | 0 |
| 2 | 5098 | 0 | 5098 | 0 | 5098 | 0 | 0 | 5098 | 0 | 5098 | 0 | 5098 | 0 | 5098 |
| 3 | 10210 | 0 | 0 | 10210 | 0 | 10210 | 10210 | 0 | 10210 | 0 | 0 | 10210 | 0 | 10210 |
| 4 | 6989 | 0 | 0 | 6989 | 0 | 6989 | 0 | 6989 | 0 | 6989 | 6989 | 0 | 6989 | 0 |
| 5 | 0 | 6852 | 6852 | 0 | 0 | 6852 | 6852 | 0 | 0 | 6852 | 6852 | 0 | 0 | 6852 |
| 6 | 0 | 6538 | 6538 | 0 | 0 | 6538 | 0 | 6538 | 6538 | 0 | 0 | 6538 | 6538 | 0 |
| 7 | 0 | 2558 | 0 | 2558 | 2558 | 0 | 2558 | 0 | 0 | 2558 | 0 | 2558 | 2558 | 0 |
| 8 | 0 | 13671 | 0 | 13671 | 13671 | 0 | 0 | 13671 | 13671 | 0 | 13671 | 0 | 0 | 13671 |
| SUM | 29135 | 29619 | 25326 | 33428 | 28165 | 30589 | 26458 | 32296 | 37257 | 21497 | 34350 | 24404 | 22923 | 35831 |

FIG. 27

|     | Description Line 1 | |
| --- | --- | --- |
| Ad | L1 | L2 |
| 1 | 6838 | 0 |
| 2 | 5098 | 0 |
| 3 | 0 | 10210 |
| 4 | 0 | 6989 |
| 5 | 6852 | 0 |
| 6 | 6538 | 0 |
| 7 | 0 | 2558 |
| 8 | 0 | 13671 |
| SUM | 25326 | 33428 |

| | Headline | | Description Line 1 | | Description Line 2 | |
|---|---|---|---|---|---|---|
| | L1 | L2 | L1 | L2 | L1 | L2 |
| SUM Clicks / Sum Conversions | 0.019323837 | 0.034943786 | 0.028666193 | 0.026085916 | 0.030853897 | 0.023832097 |
| S/N Ratio Factors | -17.05432247 | -14.41182653 | -15.29998486 | -15.72114555 | -14.97079233 | -16.12362275 |

FIG. 29B

| | Display URL | | Price | |
|---|---|---|---|---|
| | L1 | L2 | L1 | L2 |
| SUM Clicks / Sum Conversions | 0.019729382 | 0.033316819 | 0.020962504 | 0.038005303 |
| S/N Ratio Factors | -16.96232495 | -14.62620627 | -16.69356173 | -14.03328478 |

FIG. 29C

| | Bonus Offer | | Capitalization | |
|---|---|---|---|---|
| | L1 | L2 | L1 | L2 |
| SUM Clicks / Sum Conversions | 0.026550218 | 0.028110146 | 0.03180212 | 0.02425274 |
| S/N Ratio Factors | -15.64245455 | -15.38753949 | -14.8350805 | -16.0457649 |

| | Headline | Description Line 1 | Description Line 2 | Display URL | Price | Bonus Offer | Capitalization |
|---|---|---|---|---|---|---|---|
| | L2 | L1 | L1 | L2 | L2 | L2 | L1 |
| Max S/N for each factor | -14.4118265 | -15.2999849 | -14.9707923 | -14.6262063 | -14.0332848 | -15.3875395 | -14.8350805 |
| RHO | 1.123023992 | 0.234865662 | 0.564058195 | 0.908644252 | 1.501565747 | 0.147311036 | 0.699769992 |
| SUM RHO | | | | 5.179238875 | | | |
| Influence | 0.216831859 | 0.045347524 | 0.108907546 | 0.175439727 | 0.289920157 | 0.028442603 | 0.135110585 |

FIG. 30

{KeyWord: backup software}
all formats supported for just $40
free trial, reliable, professional
www.archivingexperts.com

FIG. 31

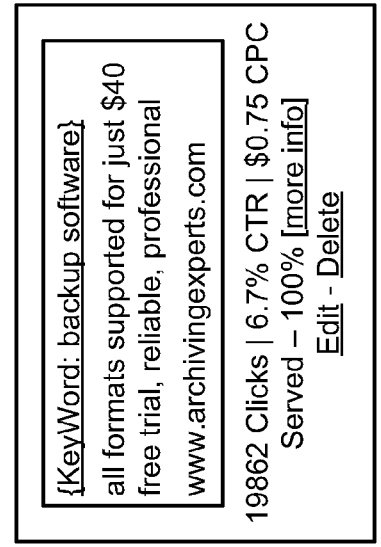

{KeyWord: backup software}
all formats supported for just $40
free trial, reliable, professional
www.archivingexperts.com
19862 Clicks | 6.7% CTR | $0.75 CPC
Served – 100% [more info]
Edit - Delete

MULTIVARIATE TESTING OPTIMIZATION METHOD

CROSS REFERENCE TO RELATED APPLICATION

This application claims priority to U.S. Provisional Patent Application No. 60/853,792 filed on Oct. 19, 2006, by Johannes Ritter, and titled "MARKETING OPTIMIZATION METHOD INCLUDING MULTIVARIATE TESTING". The contents of the above are incorporated in their entirety for all purposes.

BACKGROUND AND SUMMARY

Advertisers and marketers are often confronted with a wide range of considerations when developing an advertising or marketing campaign. Some characteristics of an advertisement, such as layout and content, may influence the type or quality of the responses that are generated from exposure of the advertisement to a particular environment. An approach is described herein, which utilizes multivariate testing as a tool for directing the development of advertisements that are optimized for a particular response. As one example, a text advertisement for an Internet webpage is optimized utilizing the multivariate testing approach. Other examples are presented whereby multivariate testing is applied across different media formats.

BRIEF DESCRIPTION OF THE DRAWINGS

FIG. 8 shows a table providing some example arrays.

FIG. 9 shows an example graphical user interface for creating a text based advertisement for a web page.

FIGS. 11-15 illustrate, by way of an example scenario, how the multivariate testing approach can be applied.

FIGS. 16-16H show example advertisements that may be tested.

FIGS. 19-23 show sample response data obtained from a multivariate test.

FIGS. 25-30 show sample calculations for carrying out the multivariate testing approach.

FIG. 31 shows an example of an optimized advertisement that was created by application of the multivariate testing approach.

FIG. 32 shows sample response data obtained for the optimized advertisement of FIG. 31.

DETAILED DESCRIPTION

An approach is provided for improving an advertising or marketing campaign by applying multivariate testing. Multivariate testing may include the application of one or more of the following methods: Discrete Choice, Optimal Design, the Taguchi Method, and the Monte Carlo method, among others.

Figure 1A:
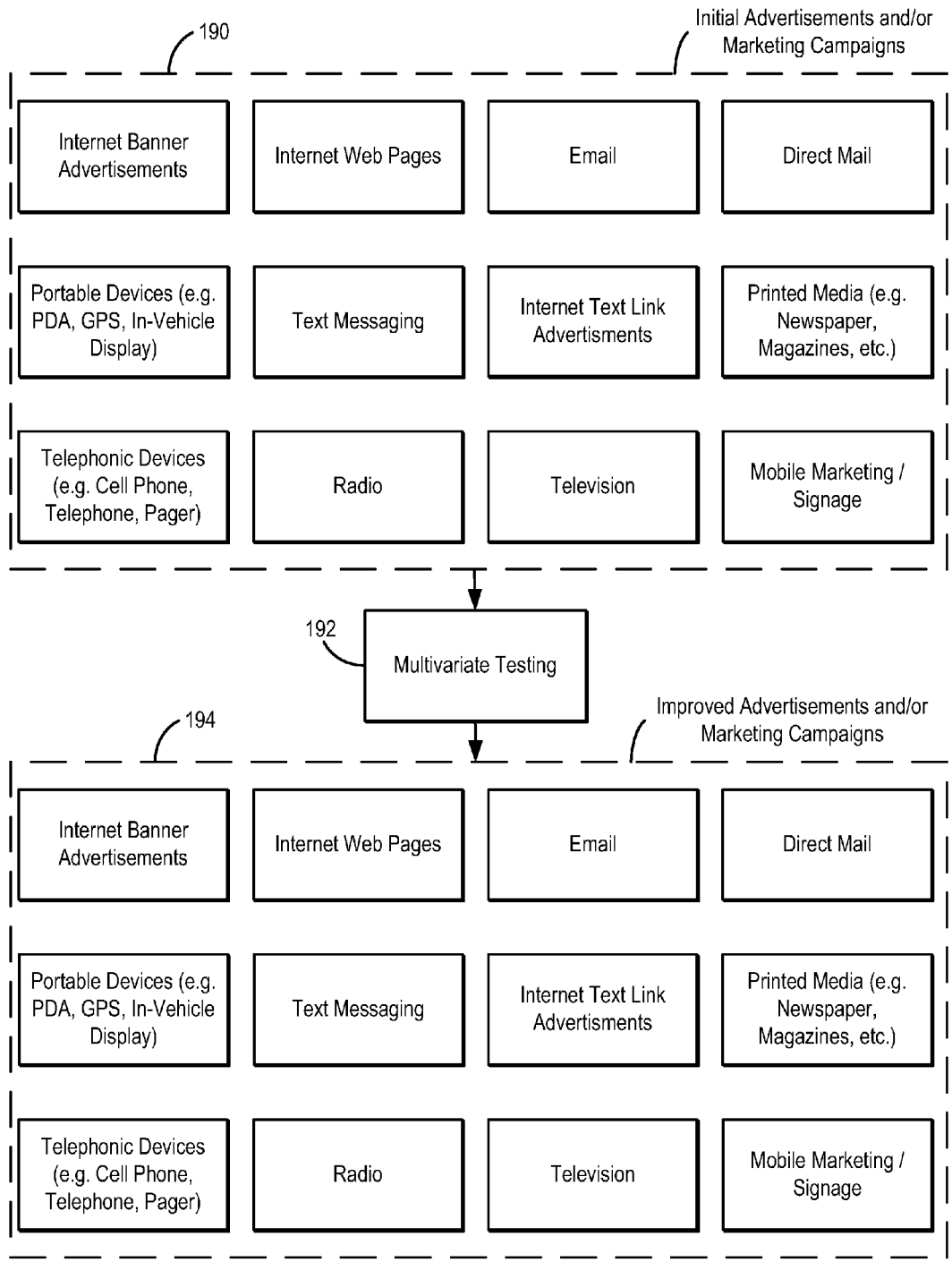
FIG. 1A illustrates some of the various media formats where an effectiveness of an advertisement or marking campaign can be improved by the application of multivariate testing.

In one non-limiting example provided herein, a multivariate testing approach is applied to Internet or web based advertising. However, it should be appreciated that the methods described herein may be applied to a variety of media formats to achieve improved advertising and/or marketing campaigns, including: Internet web page design, email, Internet banner advertisements, Internet text link advertisements, text messaging, direct or courier mail, mobile marketing, signage, printed media including newspaper, classifieds and magazine advertisements, radio, television, portable device marketing via personal digital assistants (PDA), mobile phones, global positioning systems (GPS), or in-vehicle displays, telephonic marketing via cell phones, pagers, telephones, or voice over Internet protocol (VOIP), among other forms of media, some of which are shown in FIG. 1A. For example, FIG. 1A shows how a multivariate testing approach indicated at 192 may be applied to initial advertising and/or marketing campaigns indicated at 190 to achieve improved advertising and/or marketing campaigns indicated at 194.

The advent of online advertisement has created a highly competitive advertising market. For example, internet or webpage based text advertisements such as those sold under the brand name ADWORDS by GOOGLE is both highly accessible and efficient for advertisers. Along with this increased accessibility and efficiency are some drawbacks for businesses that are currently established in the Internet market. For example, new competitors can more easily enter the Internet market via web based advertising, thereby reducing the market share of some businesses.

Figure 1B:
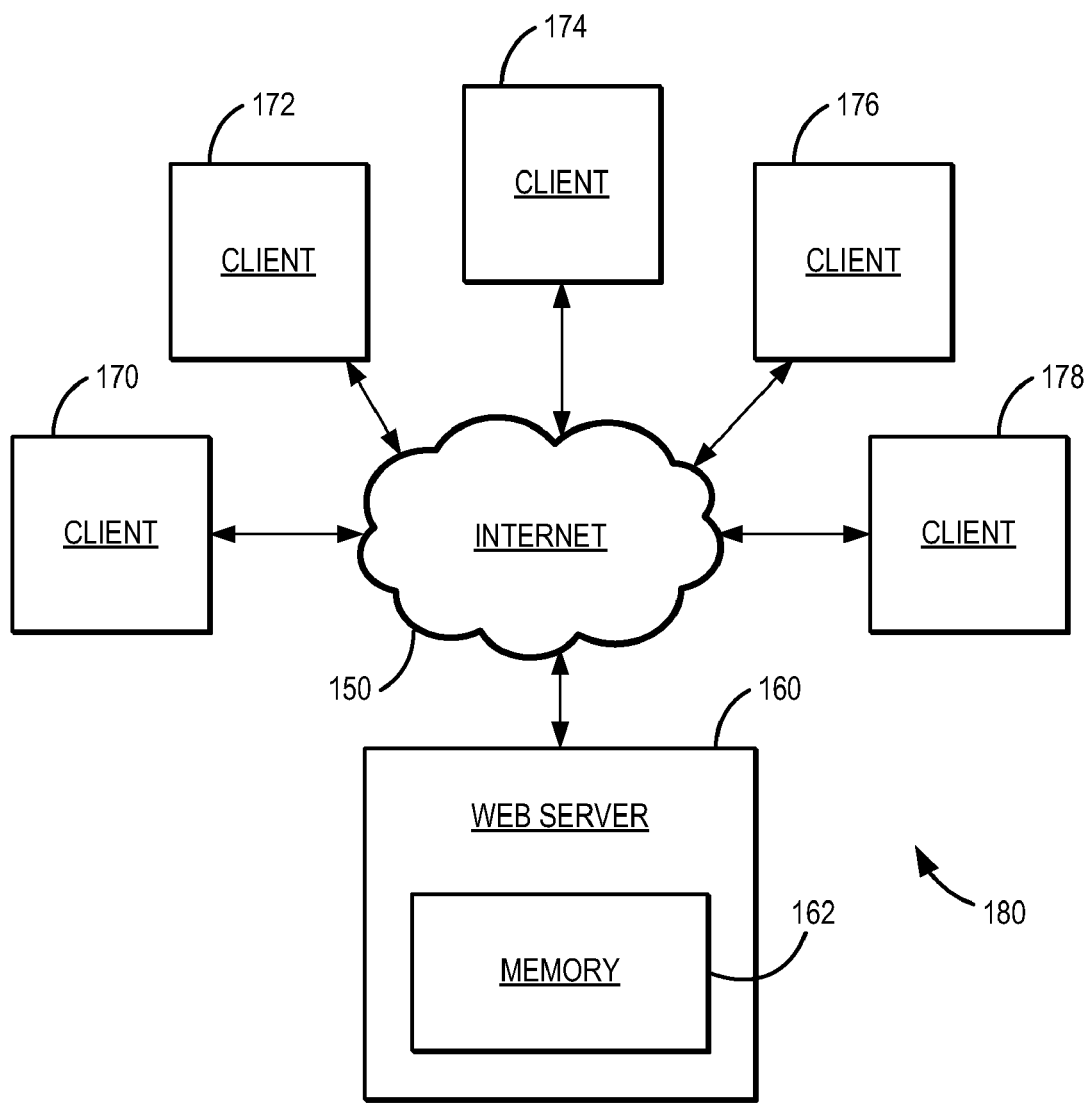
FIG. 1B shows a schematic depiction of an example network system.

In order to better illustrate the various approaches for improving an advertising campaign, an Internet software sales example will be provided herein. FIG. 1B shows an example computer network system 180. In this particular example, a web server 160 can communicate with a plurality of network clients indicated as 170-178 via the Internet 150 (as an example of a wide area network). Each of network clients 170-178 can include a client device such as a computer, mobile phone, portable digital assistant (PDA) or other suitable device. These devices may include a graphical display that can display web pages to a client user. Additionally, web server 160 in this example includes memory 162, which can store computer readable instructions to be carried out by web server 160 and clients 170-178. For example, web server 160 can be configured to provide advertisements to the web pages displayed by the various clients.

In this example scenario, a business is selling a software product to automatically archive office documents for $20 via an Internet advertising campaign. When the business started running advertisements a few months ago, there were no competitors and a single online advertisement was sufficient to attract customers. At this time, the cost-per-click (CPC) was 5 cents and the business earned an average of 80 cents from each visitor to their website. This resulted in a profit margin of 75 cents per visitor. One year later the business encountered a dramatic drop in sales. A first assumption made by the business was that something was wrong with the advertisement. As such, an examination of the online advertisement was performed. As part of the examination, a GOOGLE search query was performed and surprisingly the result of the search now indicated four advertisements, three of which were from competitors. Note that throughout GOOGLE is referred to as an example search engine and advertising source, however, the approaches, methods, systems, acts, and routines described herein may be applied to various search engines, mail marketing, and/or other advertising media. Thus, with this particular scenario, there was not only more competition, but the search rank for the business's advertisement was reduced from the first ranked position to the third ranked position. The business examined each of the new advertisements and discovered that these competitors were selling a substantially similar software product. Thus, it was concluded that the decrease in sales that was experienced was at least partially due to the increased competition, leaving the business with the question of how to remedy the situation.

Scenarios similar to this example may occur at any time with any type of product in nearly any form of media. In some cases, the cost-per-click with some Internet search companies may rise to a level where it is difficult for a business to break even. Thus, companies with high advertising budgets can afford to pay a higher cost-per-click to gain a higher rank, thereby making it more difficult for companies with smaller advertising budgets to compete in the market.

In this way, Internet marketers face the challenge of increasing or maximizing marketing return at a low or minimal cost. One approach that has been taken is simply to increase the marketing return. However, the amount that may be spent on advertising may be directly related to the profit margin for the particular product. For example, over the past few months the software business of the above scenario was accumulating an average profit margin of 75 cents from every visitor to their website. One year later the business lost a large market share to competitors. It was determined that the competitors were paying a higher maximum cost-per-click for each keyword, which pushed the business's advertisement down to the third ranked position.

In one approach to improve their marketing campaign, the business may simply increase the amount spent on advertising, for example, by increasing the maximum cost-per-click up to 50 cents, which may be enough to outbid one of the competitors of a higher ranking. Thus, if the business was able to spend more on advertising, by having a higher profit margin, then the business may be able to improve their marketing position by increasing their advertisement's search rank. However, the business may be unable to spend the amount necessary to achieve a higher rank position. For example, the business may choose to increase the cost-per-click up to 75 cents, which was the maximum that could be afforded without making a loss, but this may still be insufficient to attain the top ranked advertising position. Thus, from this scenario, it may be concluded that the competitor of higher ranking may be more effective at converting customer traffic into sales. In this way, escalating costs and increased competition may threaten the success of a business's advertising campaign. As described above, simply increasing the amount spent on advertising by spending the profit margin and trying to outbid competitors can work in some cases, but may not work in all cases.

In another approach, a business may improve profit margins in order to get ahead of competitors by improving or optimizing the marketing campaign. Traditionally, businesses would allocate a percentage of their budget to developing a new and improved marketing campaign based on focus group surveys. However, in some cases, focus group surveys may provide data that is inaccurate or misleading, thereby potentially causing the business to proceed with a misdirected advertising or marketing campaign.

However, advertising campaigns may be better directed by utilizing data from actual customer responses under real market conditions. Further, multivariate (MVT) or multivariable testing may be used to reduce the number of experiments performed, thereby reducing testing time and cost, while developing an improved advertisement. In this way, performance metrics such as conversion rate of customer traffic may be increased, enabling the business to outbid the competition for higher search rankings. As described herein, a conversion rate of four percent, for example, is the equivalent of four out of one hundred visitors to the web site purchased a product.

By giving the business's customers a choice of different advertisements, the customers can decide for themselves whether or not to respond to a particular advertisement. This approach can provide a better indication of effective or ineffective advertising than the traditional approach of focus group surveys. Further, this approach may be applied to other web based marketing and advertisement media, such as the landing page (i.e. the web page that a user is taken to after clicking on an online or web based advertisement).

Figure 2A:
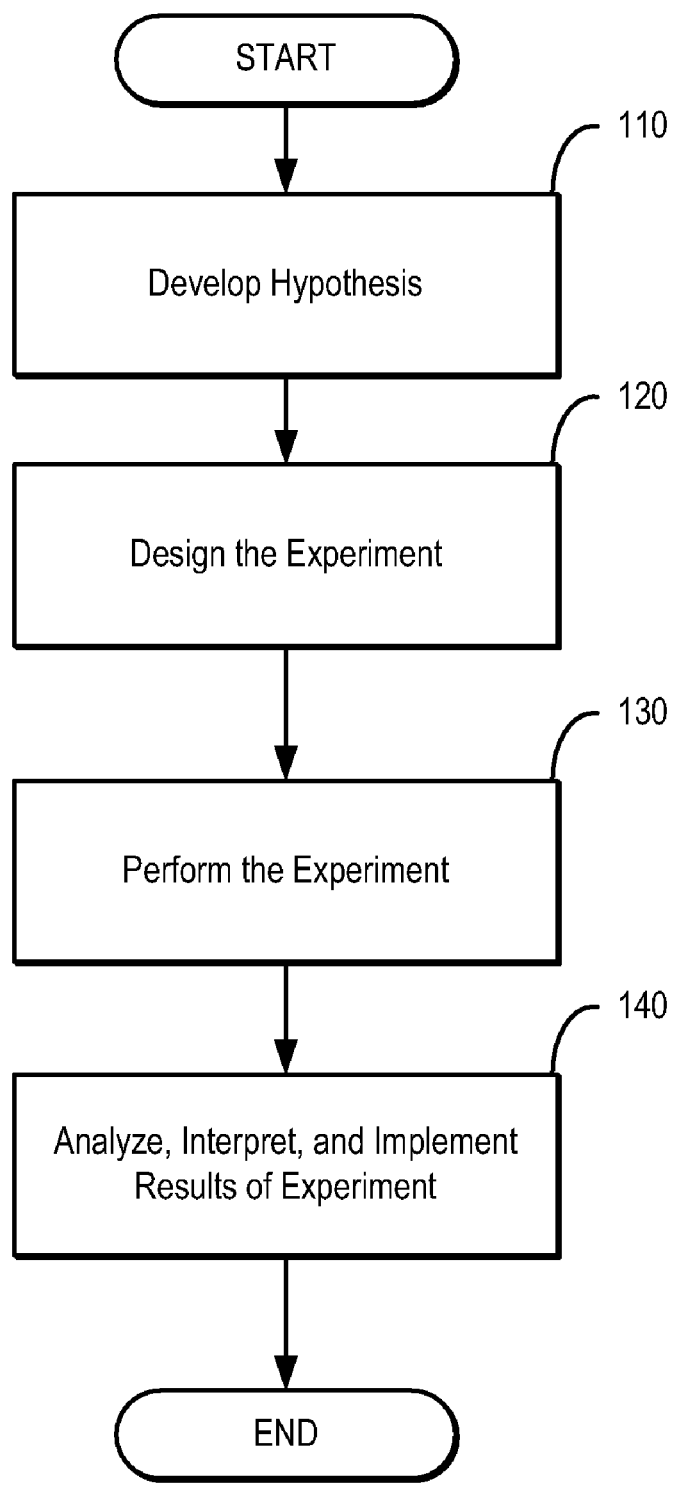
FIGS. 2A and 2B are flow charts depicting example methods for applying the multivariate testing approach.

The methods described herein may be generally categorized into four operations. FIG. 2A shows an example flow chart briefly describing these four operations, a more detailed description of which will be provided below with reference to FIGS. 2B, 10, 17, and 24. As shown in FIG. 2A, the method may begin with the development of a hypothesis at 110. This may include a brainstorming session where factors such as the related test requirements, the quantity of test factors and potential threats to test robustness are discussed. Next, the experiment may be designed at 120, which may include initialization of the test, application of the appropriate statistical methodology, transformation of selected factors into actual advertisements, and placement of the advertisement. Next, the experiment may be performed at 130, which may include monitoring and documenting the statistics or data provided by the experiment, and observing and tracking the noise factors that may impact the experiment. After experimentation is performed, the experimental test results may be analyzed, interpreted for validity, and implemented at 140 to form an improved "super" advertisement, thereby confirming the performance predictions of the experiment.

Figure 2B:
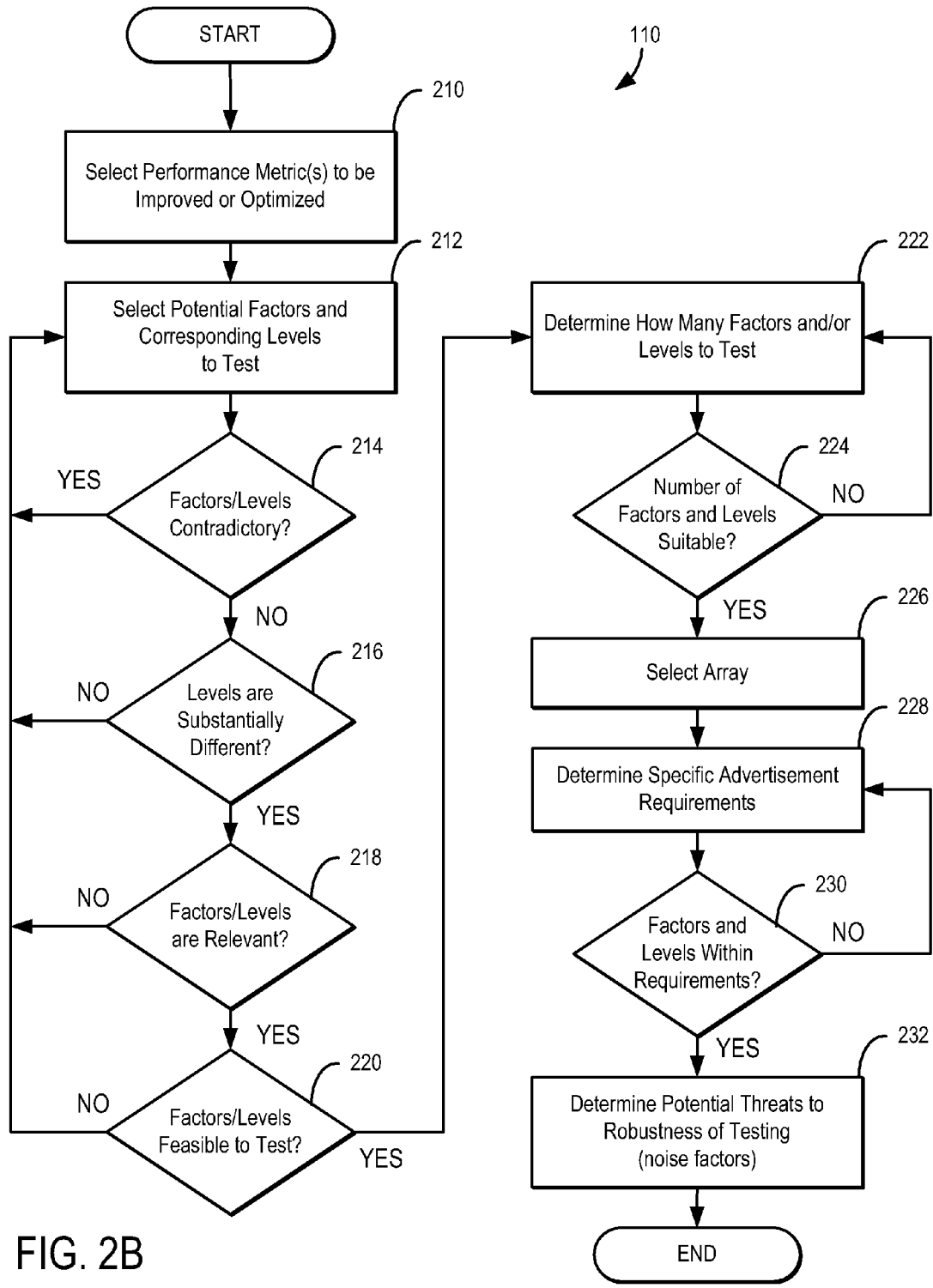

As described above with reference to FIG. 2A, a hypothesis may be developed before designing, performing, and analyzing the experiment. FIG. 2B shows, at 110, a flow chart describing in greater detail the operation of developing a hypothesis. Beginning at 210, one or more performance metric(s) may be selected that are to be improved or optimized. Possible performance metrics for web based advertising may include, for example, the click-through rate (CTR) (e.g. the rate or proportion of clients that clicks or selects the advertisement), the conversion rate (CR) (e.g. the rate or proportion of clients that purchase the advertised product or engage in the offer presented by the advertisement), an average visitor's (e.g. a client's) value, response rate, etc. As described herein, the click through rate or CTR may be one performance metric used to measure the success of an online advertising campaign. A CTR may be obtained by dividing the number of users who clicked on an advertisement on a web page by the number of times the advertisements was delivered (i.e. impressions). For example, if the advertisement was delivered 100 times (i.e. 100 impressions delivered) and 1 person clicked on the advertisement (i.e. clicks recorded), then the resulting CTR would be 1%. Further, the conversion rate may refer to the number of visitors that purchased a product from a webpage out of the total number of visitors to the webpage. Thus, a conversion rate of 10% is equivalent to 1 out of 10 visitors to a web page making a purchase.

While the above example is directed toward Internet advertising, the CTR and/or CR may have similar or dissimilar metrics in other media formats. For example, direct mail marketing may include metrics such as response rate that includes the relative number of mail recipients that respond to a particular direct mail advertising campaign.

Further, with regards to the Internet scenario presented above, a business may desire to increase the conversion rate for their web advertisement and/or landing page. As such, it may be desirable for the business to define their past and/or current conversion rate for comparison with future conversion rates caused by adjustments to their advertising campaign. In some examples, a business may seek to improve a plurality of performance metrics and would therefore define and select those performance metrics that are to be improved. In this manner, a base performance value of the old advertising campaign is available for comparison with the new advertising campaign.

At 212, potential test factors and their corresponding levels may be determined. Before describing 212 in greater detail, it may be helpful to review some background information on multivariate testing. Several terms will be used herein to refer to various parameters included in the multivariate test. A factor, as used herein, may relate to a single entity or portion of the advertisement, which may potentially influence the output of the multivariate testing approach. Factors may also include the media format or type of media. For example, if a price is included in an advertisement, one factor may be the quantity or magnitude of the price. In another example, a factor may include a photographic image or graphic. In yet another example, a factor may include a body of text.

Further, within a factor there may be one or more levels. Levels may include the specification of the factor. For example, in an advertisement with a factor such as price there may be various levels specifying the price quantity such as $100 and $200. In other examples, levels may include the specification of the image type, copy or content, text font, text size, etc. Where a factor includes the media format, the various levels may include two or more formats such as an Internet advertisement, direct mailing, television advertisement, billboard advertisements, etc. In this way, the approaches described herein with reference to the various non-limiting examples may not necessarily be confined to a single media format, but may include a plurality of different media formats.

Figure 3:
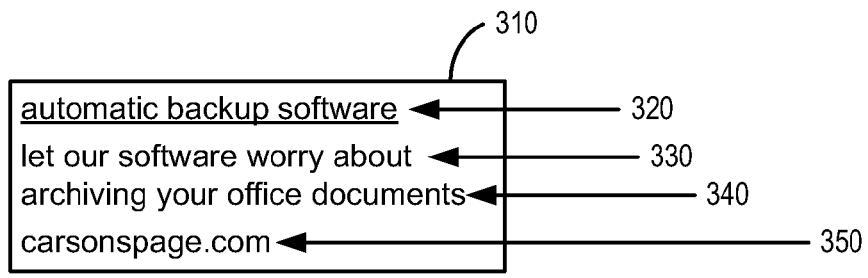
FIGS. 3-7 depict example advertisements.
Figure 4:
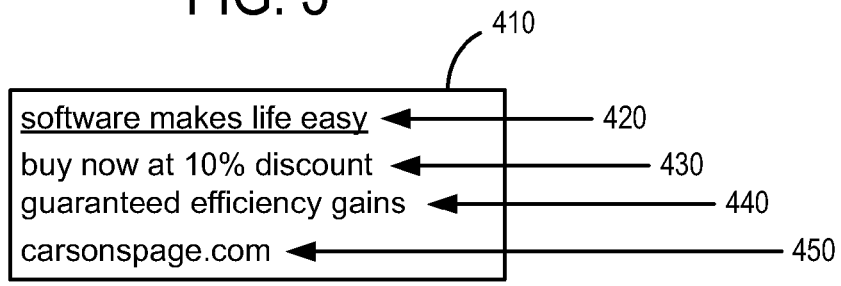

FIGS. 3 and 4 respectively show a first and second version of an example Internet advertisement, including a plurality of factors and their corresponding levels. FIG. 3 shows a first version 310 of an Internet advertisement including a title 320, an abstract having a first line 330 and a second line 340, and a URL address 350. Similarly, FIG. 4 shows a second version 410 of the Internet advertisement including a title 420, an abstract having a first line 430 and a second line 440, and a URL address 450. In one example, the title may be a first factor having a first level shown at 320 as "automatic backup software" and a second level shown at 420 as "software makes life easy". In contrast, the URL address may be another factor having only one level, wherein the URL address includes "carsonspage.com" at 350 and 450. Thus, some factors may include two or more different levels, while some factors may include only one level.

Returning to FIG. 2B, at 212 the potential factors and corresponding levels for testing may be selected. In some cases, the selection of potential factors and levels for testing may be an important part of the optimization process, as the factors and their corresponding levels may define the test structure. As one non-limiting example where a factor such as media format is used, levels may be selected to target certain groups of potential consumers. Internet advertisements may target consumers that are more likely to be using the Internet, while television advertisements may target consumers watching television, and direct mail advertisements can target consumers who do not necessarily have Internet or television access, for example.

Therefore, it may be desirable to select potential factors and levels by gathering a competent team of people for a brainstorming session. People who have experience selling the particular product may be better suited for selecting the potential factors and levels that may directly impact the outcome of the test results. For example, the brainstorming session could include members of the marketing team as well as sales personnel, accounting and customer service employees. However, in some cases, it may be found that people with the least marketing background can come up with the most revolutionary ideas. At this stage, it may be desirable for those selecting the potential factors and levels to be open minded and accept testing new slogans and ideas to achieve substantial test results. Prior to the brainstorming session, it may also be desirable for at least one member of the brainstorming session to familiarize themselves with the specific advertising requirements.

Figure 5:
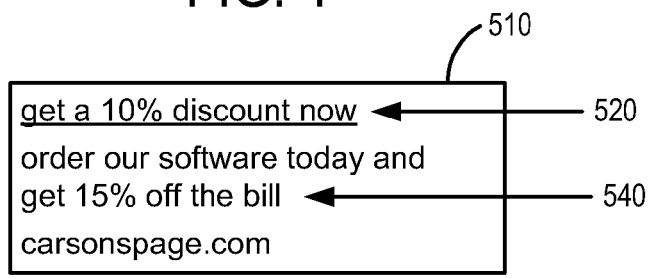

The factors and levels for testing may be selected based on the performance metric(s) defined at 210. For example, if it is desired to increase a performance metric such as click-through-rate or response rate, then it may be desirable to select factors and/or levels that may affect the click-through-rate or response rate. In one approach, factors or levels that are contradictory may be reduced or eliminated. For example, FIG. 5 shows an advertisement 510 with factors 520 and 540 that contradict each other. Therefore, it may be desirable to change at least one of the factors and/or levels so they are not contradictory.

Figure 6:
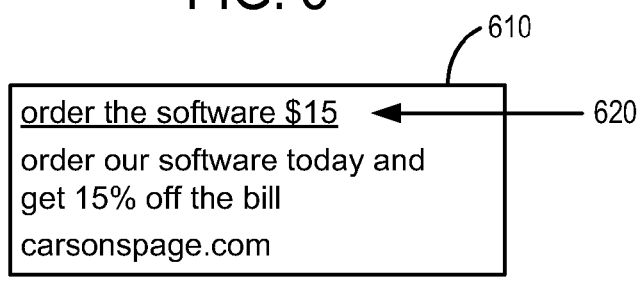
Figure 7:
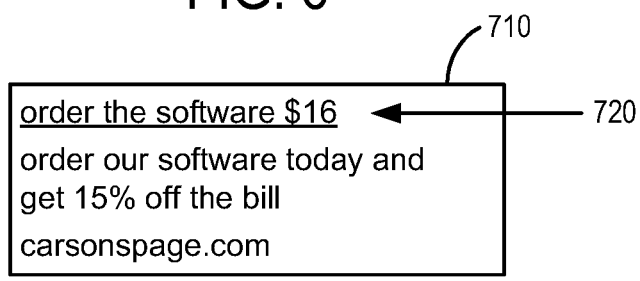

In another approach, it may be desirable to use substantially different levels within a factor. FIGS. 6 and 7 show two substantially similar price levels 620 and 720, respectively. For example, a more highly optimized advertisement can be developed when substantially different price levels such as $15 and $50 are tested using the multivariate approach rather than the two substantially similar price levels of $15 and $16 shown in advertisements 610 and 710. In yet another approach, it may desirable to test the more relevant or stronger factors and/or levels. For example, if it is known that particular factors and/or levels do not affect the selected performance metric(s), then it may be desirable to reduce or eliminate these factors and/or levels from the test. It should be appreciated that not all factors and/or levels can be tested. For example, it may be feasible to test the influence of national gross domestic product (GDP) with respect to the price level; however, it may be less feasible to test for the influence with respect to religion, unemployment, age, gender, or sexual preference. While some of these aspects may influence the output of the test, it may not be feasible to test some of these factors and/or levels because of information overload, lack of data, and/or practicability.

Thus, after potential factors and/or levels are selected at 212, the selected factors and/or levels may be examined in light of the general guidelines described above. For example, at 214 it may be judged whether any factors and/or levels are contradictory. For example, some levels may be inconsistent with some media formats. If the answer is yes, other potential factors and/or levels may be selected at 212. At 216, it may be judged whether the selected levels are substantially different from each other. For example, it may be more beneficial to test substantially different combinations of media formats such as Internet and direct mailing than media formats such as newspaper and magazine advertisements. In some examples, a greater diversity of levels may provide more relevant and useful results, at least for some scenarios. If the answer is no, other potential levels may be selected at 212. At 218, it may be judged whether the factors and/or levels are relevant to the performance metric(s) selected at 210. If the answer is no, other potential factors and/or levels may be selected at 212. At 220, it may be judged whether the factors and/or levels are feasible to test. If the answer is no, other factors and/or levels may be selected at 212.

At 222, the number of factors and/or levels for testing may be determined from the selected potential factors and/or levels. For example, after one or more potential factors and/or levels are selected during a brainstorming session or via another approach, the extent of the test may be determined. The more factors and/or levels that are tested, the larger and more time consuming the experiment may become. While multivariate testing seeks to reduce the number of tests that are performed to achieve a similar amount of statistical information, it may also be desirable to reduce the number of factors and/or levels that are tested, since there may be a trade off between a realistic time frame and the amount of knowledge gained regarding the influence of the factors and/or levels on the selected performance metric(s).

Therefore, at 224, it may be judged whether the number of selected factors and/or levels is suitable for the desired testing time frame and desired statistical information. If the answer is no, the total number of factors may be increased or decreased and/or the total number of levels may be increased or decreased at 222. For example, if multiple media formats are used, then one or more of the media formats may be eliminated, thereby reducing the number of levels associated with that factor.

In one approach, an orthogonal array may be used for setting up tests for different factor/level combinations. For example, FIG. 8 shows a table of some of the example orthogonal arrays that may be used. As one example, if three different factors are selected such as title, price, and display URL address, and each factor at two different levels (e.g. $100 and $200 as price), then the "$L_4$" array may be selected. The subscript number "4" behind the capital "L" indicates how many different advertisements are used (e.g. actually tested) during the multivariate testing. If the $L_4$ array were selected, then four different web advertisements may be used for the test. For example, a total of four different advertisements may be placed online with an Internet search site such as GOOGLE. A first person visiting the site where the advertisements were placed would see a first advertisement out of the four possible advertisements. The next person visiting the site may see a second advertisement out of the four possible advertisements having a different combination of levels for one or more of the factors. By observing how a group of people visiting the four advertisements behave or react to the advertisement (e.g. selecting the advertisement or not), the multivariate testing can be used to draw statistical inferences on the influence of the factors and/or limits tested on the selected performance metrics.

Some experiments may be designed to test the advertisement and/or landing page together. In this manner, factors and/or levels may be selected to test how the performance metric(s) may be influenced, by variations such as text font, color, pictures, special offers, etc. If the $L_{32}$ array were selected, then 31 different factors each having two levels may be tested for potential influence on the desired performance metric(s), resulting in 32 different advertisement and landing page combinations. Thus, each person visiting the advertisement and/or landing page may see one of 32 advertisement combinations. By observing the behavior of the person (e.g. whether they purchase a product or not), when confronted with different impulses (e.g. different advertisements, different landing pages, etc.) the influential factors and/or levels may be determined.

In some cases, the multivariate testing approach may be applied to find the best or most improved combination of factors and/or levels that result in the most favorable (e.g. highest or in some cases lowest) performance metric(s) selected. Alternatively, if the multivariate testing approach were not applied to a test involving, for example, 31 different factors each having 2 levels, then a total of 2,147,483,648 or $2^{31}$ different advertisements may be otherwise tested. However, this number of advertisements may be too expensive, too time consuming, or infeasible to test each combination. In contrast, the multivariate testing approach enables the testing of far fewer combinations, for example, only 32 different combinations. The mathematical and statistical approach behind the orthogonal arrays set forth by the multivariate testing approach seeks to reduce the loss of any information that may be lost when testing fewer than all of the combinations. Alternatively, other approaches may be used to identify trends in certain levels or factors with a reduced number of tests.

Referring again to the table in FIG. 8, the two arrays marked with an asterisk (*) are called mixed level arrays. These arrays are useful if some of the factors to be tested include a first number of levels and other factors to be tested include a second number of levels different from the first number of levels. For example, the $L_{18}$ array involves one factor having two levels and seven factors having three levels. While the table in FIG. 8 shows some commonly used arrays, it should be appreciated that other arrays may be used depending on the number of factors and/or corresponding levels.

Returning to FIG. 2B, at 226, at least one array may be selected corresponding to the number of factors and/or levels that are selected. For example, if the brainstorming session came up with seven different factors and assigned two levels to each of the factors, then the $L_8$ array could be selected.

At 228, the selected factors and/or limits may be compared to the requirements specific to the particular media format being tested. For example, a web based marketing campaign utilizing a search site such as GOOGLE may have GOOGLE specific requirements for the advertisement. These requirements may include character count, editorial and style rules, which need to be followed or the advertisement may not receive approval. These guidelines are in place to prevent the selection of factors and/or levels that are not feasible to test.

FIG. 9 shows an example of some of the advertising requirements that may be used with Internet advertising as provided by GOOGLE for the advertisement shown in FIG. 3. However, it should be appreciated that different media formats may have similar, different, more, or less requirements than the Internet example provided herein. For example, the headline or title may be limited to a maximum of 25 characters in an Internet advertisement, while there may be no limit for other media formats such as direct mailing. Likewise, the description lines, the display URL and the destination URL may have maximum character count requirements. Furthermore, to comply with the GOOGLE advertising policy, the advertising text may be required to clearly and concisely describe what is offered by the advertisement, resonate with the audience viewing the advertisement, be professional and easy to read, and be compelling without being misleading.

Other requirements or recommendations may also relate to spelling, text spacing, punctuation, grammar, capitalization, repetition, inappropriate language, unacceptable phrases, superlative claims, competitive claims, prices, and discount offers.

Regarding spelling: Appropriate spelling greatly contributes to the clarity and credibility of the advertisement. For this reason, the words in the advertisement should be spelled correctly. Exceptions to this are commonly misspelled words or spelling variations. If the word can be found in an online dictionary, then it may be generally acceptable. The majority of users or customers should recognize and know what the misspelled word means. However, in some cases, any suitable form of spelling may be used.

Regarding spacing: The advertisement should have appropriate spacing between each word and after punctuation. For example, "C-h-e-a-p C-l-o-t-h-e-s" may not be allowed. Similarly, "Free Shipping.Buy Now" may also not be allowed.

Regarding punctuation: Punctuation may not be used to attract a user's attention. In some cases, it cannot be unnecessary or repeated two or more times in a row. There may be specific rules governing the use of the exclamation point in the advertisement. The first line of advertisement text may not contain an exclamation point, and in some cases an advertisement can contain only one exclamation point in total.

Regarding grammar: In some cases, advertisements must comply with basic grammar guidelines. Advertisement text may use logical sentence or phrase form. In addition, symbols, numbers, or letters may be required to adhere to their true meaning; the advertisement may include them in place of words. For example, "We have a huge selection 4 U online!" may violate the grammar policy because "4 U" is replacing words.

Regarding capitalization: A word may not appear in all capital letters to draw attention to that word or phrase. For example, "FREE" or "NEW" may not be allowed. However, capitalizing the first letter in each word of your ad may be allowed.

Regarding repetition: Repetition should not be used in a gimmicky manner or for the sake of promotion. Specifically, the same word may not be repeated three or more times in a row. For example, an ad with the title "Deals, Deals, Deals Here" may not be allowed. The advertisement title may be replaced with text such as "Amazing Deals Here" to comply with this policy requirement.

Regarding inappropriate language: In some conditions, advertisements, including the display URL, may not contain language that is considered inappropriate or offensive to some users. This may also apply to misspellings, self-censored, or other variations of inappropriate language.

Regarding unacceptable phrases: Certain "call-to-action" phrases may not appear in the advertisement text if they are not descriptive of the product, service, or website. For example, phrases like "click here" and "visit us" are general phrases that may not be allowed. An example of a good "call-to-action" phrase may be "Order Your Online Contacts Today" because it is representative of the product and the site content.

Regarding superlative claims: Superlatives are words that emphasize superiority. In the interest of making sure users feel they are being treated in an honest, credible manner the advertisement text may not contain comparative or subjective phrases such as "Best", "#1", "Lowest", unless verified by a third party. This verification may be required to be clearly displayed on your website. For example, if an advertisement claims to be the "Best of the Web", the site may be required to display third party verification of the claim. A Forbes Magazine seal indicating this site received a best of the web award, for example, may be acceptable, and the ad would be approved.

Regarding competitive claims: Competitive claims include claims that imply that a product or service is better than a competitor's product or service. Competitive claims in the advertisement text may be required to be specifically supported on the landing page. This establishes trust among users and ensures that the user is finding exactly what they expect to find based on the advertisement text. These claims may be supported in a variety of ways such as a chart or table that compares the features of the product versus the competitor's product or a competitive analysis discussing why the product is superior. For example, advertisement text that states "better than product A" may be considered a competitive claim and may require support on the website. If the landing page includes a competitive analysis of the advertiser and product A, this claim may be acceptable and the advertisement may be approved.

Regarding prices: Specific prices appearing in the advertisement text may be required to be supported within 1-2 clicks of the landing page. Prices in the advertisement text may be required to be accurate. Prices can also apply to bulk purchases.

Regarding discount offers: Any specific discount offer displayed in advertisement text may be required to be supported within one or two clicks of the landing page. Examples of specific discounts which may be supported include, "50% off all items", "Save $20 on first purchase", or similar phrases. Free offers may be very appealing to users and therefore, may be required to be supported within one or two clicks of the landing page as well. However, it may be acceptable if the user can infer that the product is indeed free, even if the word free does not appear along with that product or service.

These and other requirements of GOOGLE advertisements may be found at "http://www.GOOGLE.com/ADWORDS/learningcenter/text/index.html". It should be appreciated that the requirements and guidelines described herein are just some examples of the requirements set forth by some web based search sites such as GOOGLE, and that other requirements may exist among different advertising services and/or other media formats.

Returning to FIG. 2B, at 230 it may be judged whether the selected factors and/or levels are within the requirements set forth by the specific advertising service and/or media format. If the answer is no, the factors and/or levels that do not meet the requirements may be adjusted at 228.

At 232, potential threats to robustness (i.e. noise factors) of the test may be identified. In some examples, these potential threats or noise factors may relate to those threats or factors that are controllable. With controllable factors it may be possible to assign specific values according to what is desired. For example, if one of the factors is pricing, the price may be a set value or values, such as $100, $200 or any price desired. As described above, a factor may include an entity or portion of the advertisement which may influence the outcome or result of the selected performance metric(s) that are to be examined such as conversions, click-through-rate, etc.

In some cases, events can randomly occur that may directly influence whether people respond to the advertisement. For example, a server may breakdown resulting in a potential decrease of sales or site traffic. In another example, a sudden emergence of a competitor may affect the experiment. Thus, events that are uncontrollable may also be potential threats to robustness of the experiment.

Unfortunately, extraordinary events may not be incorporated into the test design. Depending on the magnitude of their influence they can seriously flaw the test results. Further, if a server breaks down for an hour it may not have as great of an influence as when a new competitor surfaces. To overcome this problem multiple repetitions of the same experiment may be used. The more repetitions that are run, the more likely the results are to be robust, thereby improving the validity of the results. For example, a test may be run for one week during which there is no competition for the product being advertised. If the test is performed again the following week and there are two new competitors, the results may be different. In order to combat this scenario, the same test may be run again the following week and so on. Every repetition can be used to add certainty to the results. There is of course a trade-off between time and certainty. Thus, it may be desirable to determine how certain the results of the test have to be. For example, is it enough to run two repetitions and have certainty of 85% that the results are valid, or does the test require a certainty level of 95%, which would involve five more weeks of testing? It should be appreciated that this may be decided on a case to case basis and it may not be viable to set strict rules here.

As described above with reference to FIG. 2A, after the development of a hypothesis, an experiment may be designed at 120, wherein the advertisements are arranged in the appropriate format. If the selected factors and/or levels are not correctly translated into the advertisement format, then the test may produce incorrect or misleading interpretations.

Figure 10:
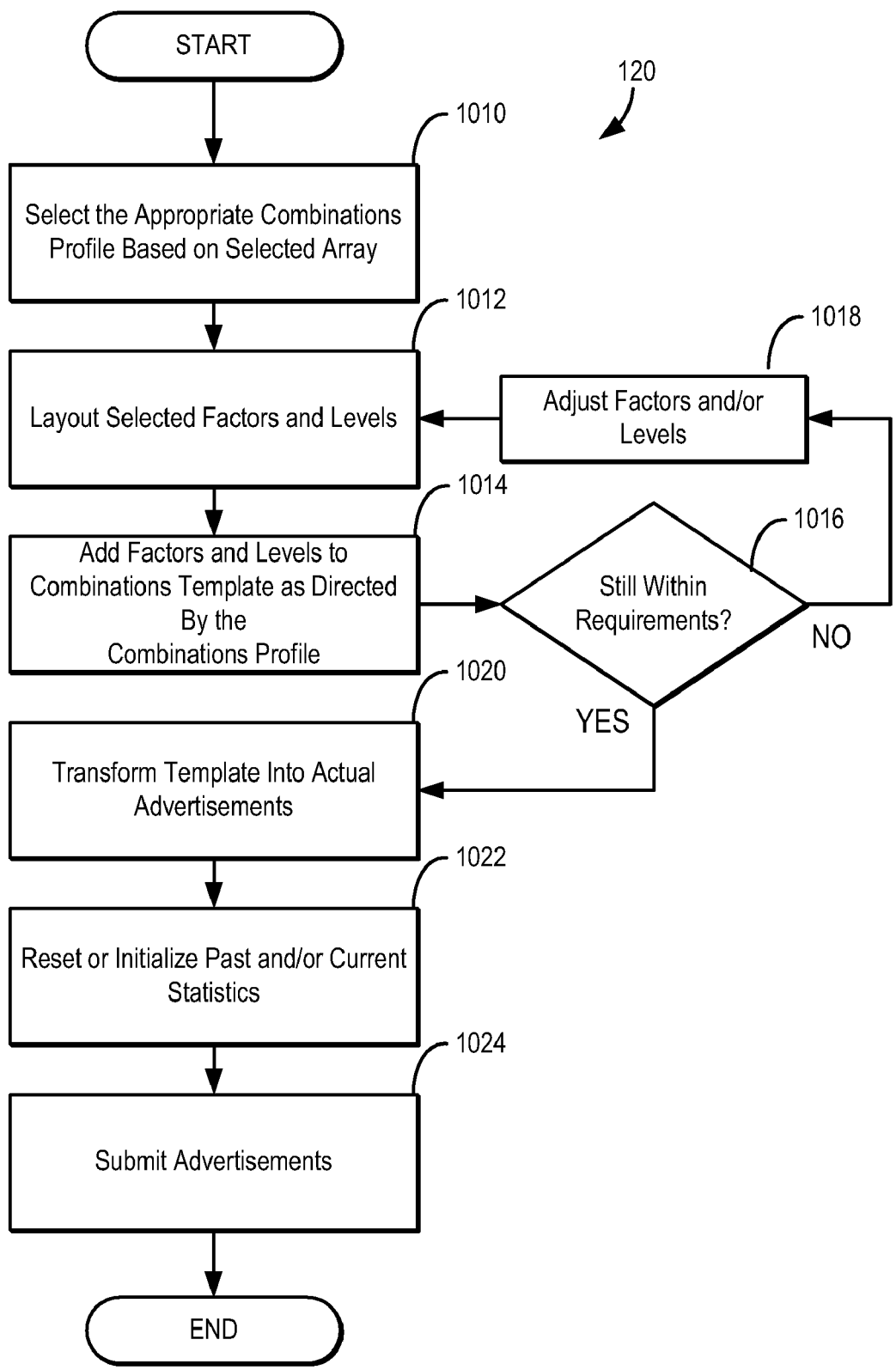
FIG. 10 is a flow chart depicting an example method for applying the multivariate testing approach.

FIG. 10 shows a flow chart describing an example approach for the design of the experiment at 120. At 1010, the appropriate combinations profile may be selected based on the array selected, for example, from FIG. 8. The resulting set of unique advertisements may depend on the array that was selected at 226 of FIG. 2B. Each of the arrays of FIG. 8 may have a corresponding standardized combinations profile, which is a subset out of all possible combinations. These profiles may be found, for example, in mathematics or statistics books for each of the selected arrays. For example, if the $L_8$ array was selected for testing, then the corresponding $L_8$ combinations profile may be selected as shown in FIG. 11.

On the vertical axis under "AD Number" are numbers corresponding to the eight different advertisements that may be tested. The row formed horizontally to the right of "Factor", are the seven different factors ("A"-"G") that were selected for the $L_8$ array. If instead, the $L_4$ array were chosen, the combinations profile would include four different advertisements on the vertical axis and three different factors on the horizontal axis. On the inside of the table, the numbers "1" and "2" indicate the levels that are to be tested. To roughly check this table for mistakes it is possible to go through it column by column ("A"-"G") and count each of the "1"s and "2"s. In one approach, each column should comprise half "1"s and half "2"s or in this case, four "1"s and four "2"s, which indicates that the levels have been used evenly. However, some approaches may use uneven distributions of levels for some or all of the factors. Another item to check is the proper number of advertisements being tested. The eight advertisements on the vertical axis should be dividable by the number of levels for each factor, which in the case is two.

At 1012, the selected factors and/or levels may be arranged, for example, as shown in FIG. 12 as relating to an example software product advertisement. These factors and levels may correspond to the factors and levels selected in FIG. 2B. In the factor column there are seven different factors for testing with the $L_8$ array. Level 1 and level 2 specify different characteristics or specifications for each of these factors. The bolded text indicates where the price and bonus offer levels will be added in the actual advertisement.

At 1014, the factors and/or levels, for example, as arranged in FIG. 12 may be added to an $L_8$ combinations template as directed by the combinations profile of FIG. 11 as shown in FIG. 15. Care should be taken during this operation, as multiple levels may affect another level within the advertisement. In one approach, the factors may be added to the $L_8$ combinations profile, but the inside of the table, containing the "1"s and "2"s may be temporarily left blank. For simplicity, the blank table for receiving the selected levels may be referred to as the template and the table including the "1"s and "2"s may be referred to as the profile, as shown in FIG. 11.

Column A of the combinations profile of FIG. 11 represents the first factor and its specifications (levels) in each of the eight different resulting advertisements. Column A of the profile may be renamed "headline" in the template, a portion of which is shown in FIG. 13. As shown in FIG. 11, the profile in column A, advertisements numbers 1-4 each have level 1 specified. As shown in FIG. 12, the level 1 for the headline factor includes the text "backup software", and so "backup software" may be added to the template in the renamed column "Headline" for advertisements 1-4 as shown in FIG. 13.

One thing to be careful about is that one of the factors includes varying levels of capitalization. Therefore, adding "backup software" in lower case letters to the template may not be correct. In one approach, to avoid mistakes, the factors that change the values of other factors may be filled in first. In other words, capitalization may be added before the "Headline" factor, for example. Depending on the level (e.g. "1"=lower case letters, "2"=mixed letters) the occurrence of factors "Headline", "Description Line 1", "Description Line 2" and "Display URL" may vary capitalization of the text. Therefore, in the profile, the factor G is the seventh factor corresponding to "Capitalization". Column G may be renamed then in the template as "Capitalization" and filled in using lower case letters in all the fields having a "1" in the profile and filled in using mixed letters where there is a "2" in the profile. This approach may be repeated for columns E and F, which correspond to factors such as "Price" and "Bonus Offer". For the factor "Headline", the first four advertisements having a "1" in the template may be filled in.

The remaining four advertisements have level 2 specified in the profile for factor "A" which again was factor "Headline" in the template. For example, the level "2" for this factor is the dynamic replace option in GOOGLE ADWORDS. In other words, whenever the advertisement is triggered with one exact keyword as specified in the campaign it may automatically appear in bold letters as the headline in the GOOGLE advertisement. When using this functionality, capitalization may not matter since the keyword will appear in the same capitalization the user typed as the search query. Therefore, "dynamic" may be added to the remaining four rows. With this functionality a default headline may be specified if the advertisement is triggered by another of the selected keywords. Here again capitalization may not matter. The level "1" of this factor may be set as the default value and capitalization may be set accordingly. Please refer to the GOOGLE manual at the URL address described above for implementing this functionality. Moving on to "Description Line 1", column B may be renamed in the template with "Description Line 1" and the corresponding levels may be added as set forth by the combinations profile of FIG. 11. This factor is now influenced by the levels, "Capitalization" and "Price" as shown in FIG. 14. For advertisement number 1 in the template this means that level "1" of factor "Description Line 1", level "1" of factor "Price" and level "1" of factor "Capitalization" may be used.

Continuing with the flow chart of FIG. 10, after the factors and levels are added to the combinations template as shown in FIG. 15, it may be a good idea to frequently check whether advertising requirements are met, as shown at 1016. If the answer is no, the factors and/or levels may be adjusted at 1018. If some dynamic elements such as, for example, the "Bonus Offer" factor are used, requirements such as character count may be exceeded. For example, advertisement number "2" in the template, "Description Line 2" may include "Free Trial, Reliable, Professional", which is equivalent to 34 characters. If "Bonus Offer" includes 11 characters, then only 24 characters for the actual factor may remain. Once all of the factors and/or levels have been adjusted and added to the combinations template as directed by the combinations profile, the template for the example described above should look like FIG. 15.

At 1020, the combinations template may be transformed into actual advertisements. It is recommended to write down each of the advertisements to avoid confusion when assembling the various factors and their corresponding levels. For example, advertisement number 1 should include:
  Headline: backup software
  Description Line 1: all formats supported for just $20
  Description Line 2: reliable, professional
  Display URL: www.carsonspage.com
Similarly, advertisement number 2 of the web based advertisement example should include:
  Headline: Backup Software
  Description Line 1: all Formats supported for Just $40
  Description Line 2: Free Trial, Reliable, Professional
  Display URL: www.ArchivingExperts.com
Further, advertisement number 3 should include:
  Headline: Backup Software
  Description Line 1: Just $20 protecting Your Data!
  Description Line 2: Free Trial, ease Backup Process
  Display URL: www.CarsonsPage.com At 1022, the advertising statistics should be reset or initialized to capture the influences of the new advertisements created by the multivariate testing approach. This operation will improve monitoring of the test. For example, if a GOOGLE campaign was used with a single advertisement group and a single advertisement, GOOGLE would provide statistics for this advertisement since the advertisement was first activated. However, the multivariate testing approach seeks to improve the campaign or at least the performance metric(s) selected. Therefore, it may be necessary to delete the previous advertisement(s) and not just pause them. In some cases, if the advertisements are paused, then GOOGLE may still include this advertisement into the statistics that are provided, which may flaw the test. Thus, in one approach, it is recommend that previous advertisements are deleted or a new a new campaign should be created, while the previous campaign is paused. Further, it may be advisable to use the same keywords for the new campaign so that the tests are comparable. At 1024, the advertisements may be submitted and the testing phase may be started. The eight advertisements for the example web campaign are shown in FIGS. 16A-16H, respectively.

Figure 17:
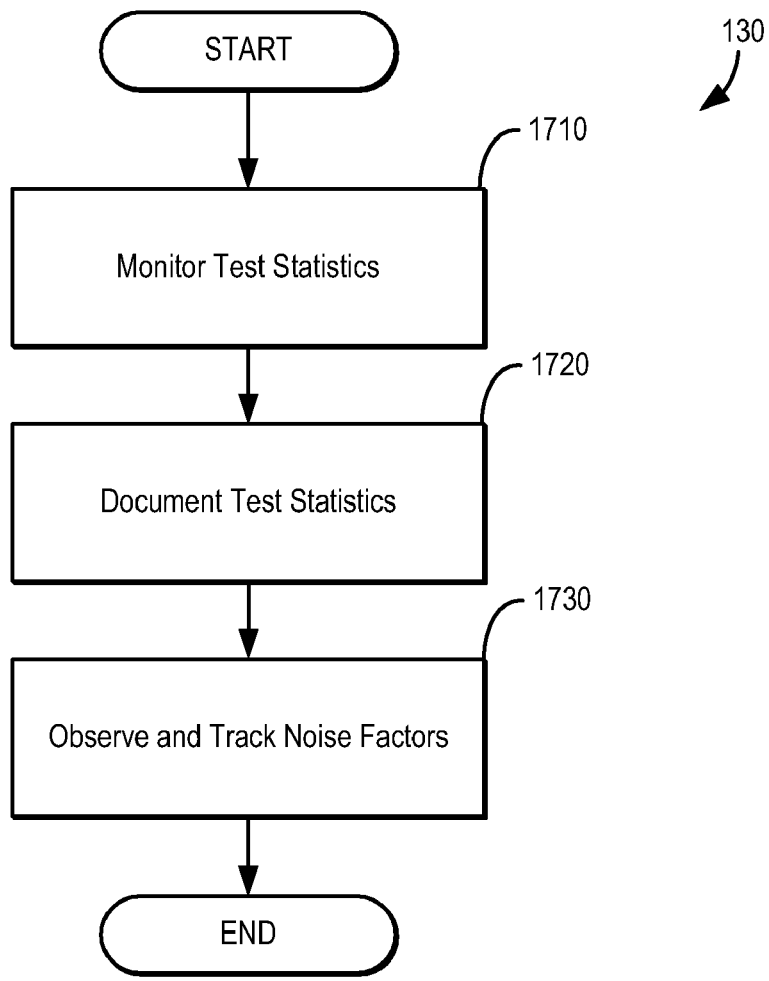
FIG. 17 is a flow chart depicting an example method for applying the multivariate testing approach.

As described above with reference to FIG. 2A, after the experiment is designed, the experiment may be performed at 130, wherein the advertisements are submitted and the resulting test data is gathered. FIG. 17 shows a flow chart describing an example approach for performing the experiment at 130. At 1710, the test data or statistics provided from the experiment may be monitored.

Figure 18:
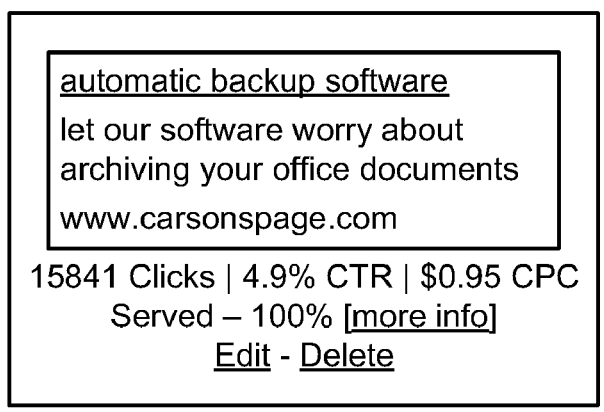
FIG. 18 shows example responses to an advertisement.

At this point, the online advertisements have been submitted and results may be measured. It should be appreciated that this is one of the advantages of the marketing approach provided herein. Other marketing methods are usually not measurable. For example, a company running a marketing campaign may see their revenue increase, but may be unable to explain why the increase occurs. As described above, it is possible to measure the success of the new advertisements by comparing the results, for example, of the selected performance metric(s) to the baseline results from the prior advertisement(s). With web based campaigns using GOOGLE, for example, it may be relatively easy to retrieve the past results or statistics from the prior advertisements. FIG. 18 shows an example of the statistics provided from a web based advertising campaign using GOOGLE. During this time, the conversion rate was approximately 4 percent.

At 1720, the test statistics may be documented including the baseline statistics retrieved from the prior advertising campaign. It may be useful to determine a time interval in which to track the results. This may depend on the amount of clicks that are received within a time period. For example, if the advertisements receive ten clicks per day it may not be necessary to record the results each day. One approach would be to record the results weekly or if the advertisements generate greater than 50 click per day, then results may be recorded each day. In another approach, the time interval for recording the results may be a week, thereby reducing at least some of the noise factors that may affect the test results. Generally, people respond to advertisements differently on the weekend. Thus, one example of noise that may affect the results is the weekend. For example, some advertisements during the weekend may receive more or less clicks compared to working days. Further, in one approach, to monitor the statistics it is recommended that the data is recorded in an orderly manner. Mistakes at this stage unfortunately may never be compensated. For example, if numbers are added to the incorrect column or different intervals are used during the test, some or all of the experiment may be flawed.

FIGS. 19A and 19B show an example spreadsheet for recording the resulting statistics. In this example, weekly monitoring was used. While the spreadsheet of FIGS. 19A and 19B may include more information and/or performance metric(s) than were selected, it may be nonetheless desirable to track additional information. The additional information may be helpful if the analysis of other performance metrics is desired.

If weekly monitoring was used then a separate spreadsheet shown in FIGS. 19A and 19B could be used for each week of the test. The time interval, such as the dates corresponding to the first and last day of the interval, may be entered into the time column for each advertisement. For example, the "Data 1" column of FIG. 19 would include the data for advertisement number 1. FIGS. 20-23 show the example spreadsheet of FIGS. 19A and 19B with the results added from four separate one week time periods.

Returning to FIG. 17, the potential noise factors may be observed and tracked. While reviewing the statistics that were recorded it may be useful to examine the data for irregularities. In some cases, sudden fluctuations in the resulting data and/or selected performance metrics may occur. For example, if an online advertising campaign usually experiences impressions between 330,000 and 370,000 and a particular one week period indicates a sudden drop to 120,000 impressions, potential noise factors may be involved. As described above, if these noise factors and/or uncontrollable events are not accounted for then the results of the test may be biased. Thus, one approach may be to extend the testing period and/or not using statistics from a time period where noise factors or uncontrollable events may have affected the test.

Figure 24:
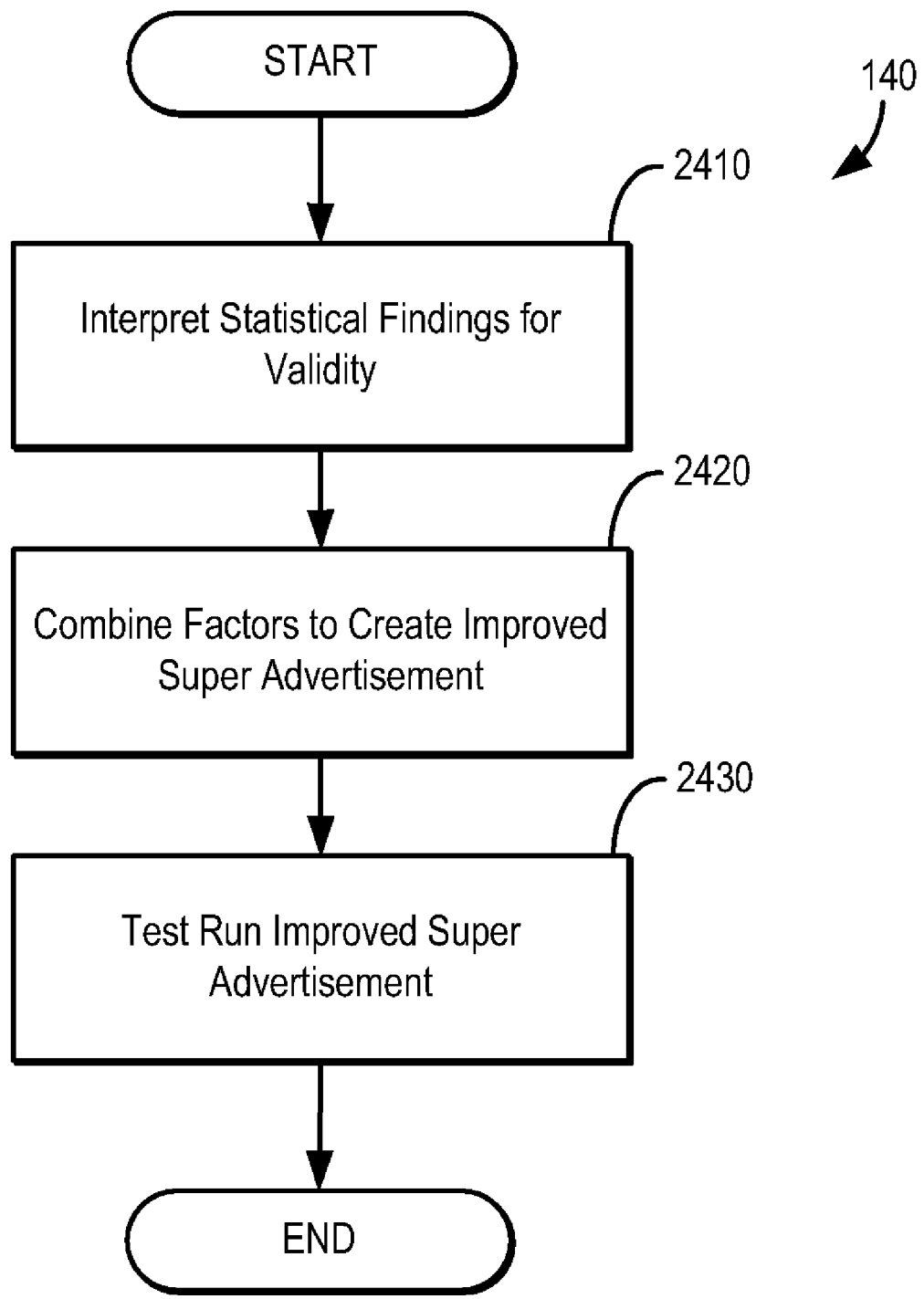
FIG. 24 is a flow chart depicting an example method for applying the multivariate testing approach.

As described above with reference to FIG. 2A, after the experiment is performed at 130, the resulting data may be analyzed at 140. FIG. 24 shows a flow chart describing an example approach for analyzing the resulting test data. At 2410, the statistical data may be interpreted for validity. The results of the data interpretation may be used to determine which factors and/or levels should be combined to achieve an improvement of the selected performance metric(s).

In one approach, a statistical number called S/N ratio may be used to draw inferences about interpreting the results of the test and generally seeks to minimize or reduce variation in outcome. For the purposes of this approach, it is desirable for the S/N ratio to be as high as possible, resulting in performance metric(s) such as conversion rates that do not substantially fluctuate with time. One way to decide what factors contribute the most to variability is to calculate the S/N ratios for each level of each factor. When comparing these S/N ratios, it may be observed that some factors have larger ratios than others.

FIG. 25 shows an example spreadsheet that may be used to calculate the average S/N ratio for the entire testing period. In one approach, the S/N average may be calculated by determining the average performance metric for each advertisement, such as for example, the average conversions, and determining the sum of the advertisement's performance metrics. As shown in FIG. 25, the sum of the average conversions is 0.027198148. The S/N average may be calculated for the average conversions by:

10*LOG 10(average conversions/(1−average conversions))

which for the example shown in FIG. 25, may be written as:

10*LOG 10(0.027198148/(1−0.027198148))

Next, the S/N ratio may be determined for each of the factors and levels. This may be performed as described above with reference to FIG. 25, where each factor and corresponding level is considered independently. For example, level 1 of factor 1, level 2 of factor 1, level 1 of factor 2, etc. FIGS. 26 and 27 show spreadsheets for determining S/N ratios for each of the factors and levels for performance metrics such as the number of conversions and the number of clicks, respectively. As shown in FIGS. 26 and 27, "L1" and "L2" refer to level 1 and level 2, respectively. For example, the number of clicks (e.g. the number of times a client user selected the advertisement) may be counted over the entire test where either level 1 or level 2 of factor "Description Line 1" are involved. As described above, each of the factors may include an equal number of level 1 and level 2 specifications shown as factor "B" in the combinations profile of FIG. 11. FIG. 28 shows "Description Line 1" for levels 1 and 2, which correspond to factor "B" in the profile. In advertisement numbers 1, 2, 5 and 6 the factor is at level 1, so the data under "Sum Clicks" taken from FIG. 25 may be supplied to the table of FIG. 28 as 6838, 5098, 6852 and 6538 in the left table, respectively. The operation may be repeated for advertisement numbers 3, 4, 7, and 8 with 10210, 6989, 2558, and 13671, respectively. In this manner, the spreadsheets of FIGS. 26 and 27 may be developed for nearly any form of statistical data resulting from the test.

The preparation of the spreadsheets shown in FIGS. 26 and 27 describing the number of conversion and the number of clicks for each factor and/or level may be used to determine the S/N ratios for each of the factors. As described above with reference to the average S/N ratio, "Sum Conversions" may be divided by "Sum Clicks", wherein the quotient may be used in the LOG formula described above. This operation may be performed for each of the factors and levels resulting in 14 S/N ratios. FIGS. 29A, 29B, and 29C show a spreadsheet with the "Sum Clicks" divided by the "Sum Conversions" and the resulting S/N ratio for each of the 14 factors and levels.

After each of the 14 ratios is determined, the largest S/N ratio for each factor may be determined, enabling a selection of the most influential level for each factor. FIG. 30 shows a spreadsheet including the highest S/N ratio for each of the factors under the horizontal row "Max S/N for each factor". Next, the "RHO" may be determined by subtracting the "Max S/N for each factor" from the average S/N ratio as determined above with reference to FIG. 25. Next, all of the "RHO"s may be added resulting in the "SUM RHO". Finally, the "RHO"s for each factor may be divided into the "SUM RHO" resulting in the "Influence". As described herein, the higher the "influence", the great the factor and/or level influences the test and therefore, the selected performance metric(s).

For example, the "Price" factor is shown in FIG. 30 to have the highest "Influence". Thus, price may have the greatest influence on a visitor's decision, for example, to purchase a product. As described above for this example, the level 2 of the price factor was $40.

In some cases, the multivariate testing approach may yield results that are confusing. It may seem strange that visitors are more likely to buy the example software product at a price of $40 rather than $20, yet this scenario may nonetheless be possible. For example, the visitors may have thought that the more expensive product was more developed than the less expensive product. However, an influence below 5% or 0.05, for example, as shown in FIG. 30 for "Description Line 1" may be the result of statistical noise. Thus, in one approach either of the two levels may be chosen for the "Description Line 1" factor, but this does not necessarily mean that another value may be substituted for either of these levels.

After the levels providing the greatest influence to the selected performance metric(s) are determined, these levels may be combined to create an improved advertisement or super advertisement. So far, however, the multivariate testing approach has only predicted that the combination of the most influential levels would create an improved advertisement. In one approach, the interpreted data described above may be used to predict what the new performance metric may be for the new advertisement. This may be achieved by subtracting the "Average S/N ratio" from the "Sum RHO", which yields the projected S/N ratio. In the example described above, the projected S/N ratio would be equal to −10.355612 or the difference of 5.179238875 minus 15.53485053. Next, by inverting the LOG formula described above, the average conversions may be determined. Thus, for the predicted S/N ratio, the new super advertisement is predicted to produce a conversion rate of approximately 0.0843648 or 8.5%. While only one super advertisement is created and tested in the example described herein, it should be appreciated that two or more different super advertisements may be selected and tested. For example, the three best advertisements may be used.

Returning to FIG. 24, the factors and/or levels may be combined to create the improved advertisement at 2420. For example, the new advertisement may include the following levels taken from FIG. 30.

Factor Headline: Level 2
Factor Description Line 1: Level 1
Factor Description Line 2: Level 1
Factor Display URL: Level 2
Factor Price: Level 2
Factor Bonus Offer: Level 2
Factor Capitalization: Level 1

The resulting improved super advertisement is shown in FIG. 31. In some examples, the super advertisement may be different from advertisements tested. Thus, the multivariate testing approach can be used to determine the super advertisement by testing only a portion of the total possible advertisements.

Finally, at 2430, a test run of the super advertisement may be performed to confirm whether the predicted results were correct. In some examples, the actual results may differ to a relatively small degree from the predicted results. An example of the actual results is shown in FIG. 32. After the super advertisement was run for a week, the new conversion rate was found to be 8.13% compared to the predicted new conversion rate of 8.5%.

If the initial profit margin of the business was 75 cents, which came from average profit of 80 cents per visitor minus a 5 cents cost-per-click. The 80 cents came from the conversion rate which was initially at 4% and the number of clicks 11961 for the last week before the multivariate testing approach was applied. This means that the business had approximately 480 sales at this time, each resulting in $20 of revenue. However, the super advertisement improved the conversion rate to approximately 8.1% with 19862 clicks and a cost-per-click of 75 cents, which results in around 1600 sales for the week. Each sale is now $40, which equals approximately $3.22 as the average sales produced per visitor. Therefore, the profit margin is now $3.22 minus $0.77, which yields $2.47, a profit margin increase of over 300%.

Thus, by using the multivariate testing approach, it was possible to increase the profit margin of the business, wherein the increased profit margin may enable the business to pay more per click to further improve search ranking for the advertisement. It should be appreciated that in an application where a factor includes the media format and the corresponding levels include media such as Internet, television, mail, signage, etc., the super advertisement may include only one media format. Alternatively, a plurality of super advertisements may be used, for example, by utilizing two or more different media formats such as an Internet advertisement and a direct mail advertisement. Thus, the various methods and approaches described herein may be applied across a group of different media formats.

Although the present disclosure includes specific embodiments of the multivariate testing approach, specific embodiments are not to be considered in a limiting sense, because numerous variations are possible. The subject matter of the present disclosure includes all novel and nonobvious combinations and subcombinations of the various elements, features, functions, and/or properties disclosed herein. The description and examples contained herein are not intended to limit the scope of the invention, but are included for illustration purposes only.

Note that the example flow charts included herein may represent any number of strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described operations may graphically represent code to be programmed into the computer readable storage medium.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A network server including a computer readable storage medium, having instructions executable to:
    serve to network clients from the network server a plurality of webpage advertisements, each advertisement including text representative of an offer, said text having factors and levels, where at least two respective advertisements served to network clients have at least one of a different factor and a different level and wherein the plurality of served advertisements form only a subset of a total number of advertisements covering every, combination of the different factors and levels;
    receive a set of responses from the clients of the plurality of served webpage advertisements subset;
    correlate the set of responses to the factors and levels utilizing multivariate testing, wherein the correlating using multivariate testing includes determining an influence of each level and each factor on the set of responses, the correlation based on the served webpage advertisements subset; and
    serve to network clients from the network server at least an improved webpage advertisement including the offer represented by text having optimized factors and levels, said optimized factors and levels based on the correlation and permitted characteristics of the offer.

2. The medium of claim 1, wherein the different factors and levels differ with respect to capitalization of at least one text character.

3. The medium of claim 1, wherein the factors or levels differ with respect to punctuation.

4. The medium of claim 1, wherein the factors or levels differ with respect to text font type or text size.

5. The medium of claim 1, wherein the factors or levels differ with respect to text color.

6. The medium of claim 1, wherein the permitted characteristics of the offer include a maximum number of text characters.

7. The medium of claim 1, wherein the permitted characteristics of the offer include no contradictions between terms of the offer.

8. The medium of claim 1, wherein a first webpage advertisement in the subset includes static text and a second webpage advertisement in the subset includes dynamic text that is configured to vary with at least one keyword contained on a webpage to which the second advertisement is served.

9. The medium of claim 1, wherein at least some of the set of responses include a click-through indication.

10. The medium of claim 1, wherein at least some of the set of responses include a purchase conversion indication.

11. The medium of claim 1, wherein a first webpage advertisement in the subset includes descriptive content that is different than a second webpage advertisement in the subset.

12. The medium of claim 11, wherein the descriptive content includes a price term associated with the offer.

13. The medium of claim 11, wherein the descriptive content includes a uniform resource locator address.

14. The medium of claim 11, wherein the descriptive content includes a bonus offer.

15. A method of advertising to clients of a wide area computer network, comprising:
- serving to network clients via the wide area network a plurality of webpage advertisements, the plurality of advertisements representing a subset of a total number of advertisements covering every combination of a different set of features including a static text headline, a dynamic text headline, and different arrangements of descriptive content;
- receiving at a web server a set of responses from the clients of the subset of served webpage advertisements;
- correlating at the web server the set of responses to the static text headline, dynamic text headline, and different arrangements of descriptive content utilizing multivariate testing, wherein the correlating using multivariate testing includes determining an influence of the static text headline, the dynamic text headline, and each arrangement of descriptive content on the set of responses, the correlation based on the subset of served webpage advertisements; and
- serving to network clients at least an optimized webpage advertisement including one of the static text headline or the dynamic text headline and further including an optimized arrangement of descriptive content based on said correlation.

16. The method of claim 15, wherein the different arrangements of descriptive content include at least a price term of an offer.

17. The method of claim 15, wherein the different arrangements of descriptive content include at least a text characteristic.

18. The method of claim 17, wherein the text characteristic includes at least one of text color, text size, font type, and number of text characters.

19. A network server including a computer readable storage medium, having instructions executable to:
- serve to network clients from the network server a plurality of webpage advertisements, each advertisement including text representative of an offer, said text having factors and levels, where at least two respective advertisements served to network clients having different factors and different levels, the factors including a media format, and wherein the plurality of served advertisements form only a subset of a total number of advertisements covering every combination of the different factors and levels;
- receive a set of responses from the clients of the plurality of served webpage advertisements subset;
- correlate the set of responses to the factors and levels utilizing multivariate testing, wherein the correlating using multivariate testing includes determining an influence of each level and each factor on the set of responses, including determining a media format influence, the correlation based on the served webpage advertisements subset; and
- serve to network clients from the network server at least an improved webpage advertisement including the offer represented by text having optimized factors and levels, including an optimized media format, said optimized factors and levels based on the correlation and permitted characteristics of the offer.

* * * * *